United States Patent
Liu et al.

(10) Patent No.: US 12,055,274 B2
(45) Date of Patent: *Aug. 6, 2024

(54) OPTIMIZATION METHOD FOR NATURAL GAS PIPELINE OPERATION UNDER THE CARBON NEUTRALITY TARGET

(71) Applicant: Southwest Petroleum University, Chengdu (CN)

(72) Inventors: Enbin Liu, Chengdu (CN); Yong Peng, Chengdu (CN); Shanbi Peng, Chengdu (CN); Bin Yu, Chengdu (CN); Hongbing Zhang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,980

(22) Filed: Jul. 24, 2022

(65) Prior Publication Data

US 2023/0071756 A1    Mar. 9, 2023

(30) Foreign Application Priority Data

Aug. 18, 2021  (CN) .......................... 202110948661.7

(51) Int. Cl.
*F17D 5/00*      (2006.01)
*G05B 17/02*     (2006.01)

(52) U.S. Cl.
CPC ............. *F17D 5/005* (2013.01); *G05B 17/02* (2013.01)

(58) Field of Classification Search
CPC ................. F17D 5/005; G05B 17/02
See application file for complete search history.

(56) References Cited

U.S. PATENT DOCUMENTS

| | | | |
|---|---|---|---|
| 2010/0217550 A1 | 8/2010 | Crabtree et al. | |
| 2019/0153823 A1 | 5/2019 | Peng | |
| 2020/0372588 A1 | 11/2020 | Shi | |

FOREIGN PATENT DOCUMENTS

| | | | |
|---|---|---|---|
| CN | 109102104 A | 12/2018 | |
| CN | 109494809 A | 3/2019 | |
| CN | 110163443 A | 8/2019 | |

(Continued)

*Primary Examiner* — James J Lee
*Assistant Examiner* — Shon G Foley
(74) *Attorney, Agent, or Firm* — Nitin Kaushik

(57) ABSTRACT

The present invention discloses an optimization method for natural gas pipeline operation under the carbon neutrality target. From the perspective of energy structure adjustment, the present invention proposes a complete low-carbon and low-consumption optimization model of long-distance natural gas transmission network, which is used for fine calculation of multi-energy carbon emissions and energy consumption in the transportation process of natural gas pipeline network; according to different energy structure backgrounds, the corresponding objective function for minimum carbon emissions is established, the optimization algorithm is adopted to solve the objective function for minimum carbon emissions and work out the optimal scheduling scheme. The present invention can realize energy conservation and emission reduction in the process of pipeline transportation and provide technical support for achieving the target of "peak carbon dioxide emissions and carbon neutrality" in the entire natural gas industry of China as early as possible.

9 Claims, 27 Drawing Sheets

(56) References Cited

FOREIGN PATENT DOCUMENTS

| | | |
|---|---|---|
| CN | 110210747 A | 9/2019 |
| CN | 110489708 A | 11/2019 |
| CN | 111950122 A | 11/2020 |
| CN | 112332412 A | 2/2021 |
| CN | 112417652 A | 2/2021 |
| CN | 112749462 A | 5/2021 |
| CN | 112949903 A | 6/2021 |
| CN | 113032935 A | 6/2021 |
| KR | 20130044080 A | 5/2013 |
| WO | WO-2018051108 A1 * | 3/2018 ........... G05B 13/048 |

* cited by examiner

OPTIMIZATION METHOD FOR NATURAL GAS PIPELINE OPERATION UNDER THE CARBON NEUTRALITY TARGET

CROSS-REFERENCE TO RELATED APPLICATIONS

The application claims priority to Chinese patent application No. 202110948661.7, filed on Aug. 18, 2021, the entire contents of which are incorporated herein by reference.

TECHNICAL FIELD

The present invention relates to the technical field of pipe network optimization, in particular to an optimization method for natural gas pipeline operation under the carbon neutrality target.

BACKGROUND

Global warming may lead to redistribution of global precipitation, melting of glaciers and frozen soil and rise in sea level, etc. It will not only endanger the balance of natural ecosystems, but also affect human health and even threaten human survival. Global warming is mainly caused by the increase of carbon dioxide content, which produces a greenhouse effect. The effective way to prevent global warming is to offset carbon dioxide emissions and achieve "zero emissions" of carbon dioxide through afforestation, energy conservation and emission reduction, etc.

The study showed that carbon dioxide emissions were closely related to energy consumption. In China, the energy supply chain and its production process account for 43.8% of total carbon dioxide emissions. From 2011 to 2019, China's natural gas import volume increased year by year. It is expected that from 2024 to 2030, China's average total demand for natural gas will rise from 315.378 billion $m^3$ to 436.327 billion $m^3$, which will increase carbon emissions in the transportation process of natural gas pipeline. In order to cope with the increasing demand for natural gas and the new challenges brought by carbon emissions in the energy supply process, the traditional optimal scheduling scheme of natural gas pipe network needs further technological innovation to reach the low carbon emission standard.

SUMMARY

In view of the above problems, the present invention aims to provide an optimization method for natural gas pipeline operation under the carbon neutrality target.

The technical solution of the present invention is as follows:

An optimization method for natural gas pipeline operation under the carbon neutrality target, including the following steps:

Step 1: Determine the type of decision variable, and obtain the initial inlet parameters of compressor station; the decision variable is as follows:

$$X=(Q,N,R,S) \quad (1)$$

Where, X is the decision variable; Q is the pipeline transmission capacity, in $m^3/s$; N is the number of compressors started in each compressor station; R is the rotating speed of compressor, in l/min; S is the connection status between two pipelines;

Step 2: Judge the connection status between two pipes, determine the flow of each pipe according to the connection status, and then calculate the outlet pressure and outlet temperature of the compressor station;

Step 3: Make the outlet pressure of compressor station equal to the inlet pressure of the next pipe section and the outlet temperature of compressor station equal to the inlet temperature of the next pipe section, and then calculate the terminal temperature and terminal pressure of the next pipe section;

Step 4: Make the terminal pressure of the previous pipe section equal to the inlet pressure of compressor station at the next section and the terminal temperature of the previous pipe section equal to the inlet temperature of compressor station at the next section; repeat the Steps 2 to 4 until the pressure and temperature changes of each compressor station in the system are calculated;

Step 5: Set the constraint conditions and calculate the gas consumption of gas driven compressor and the power consumption of electric driven compressor in the pipeline system;

Step 6: Introduce the carbon emission coefficient, calculate the carbon emissions of compressors driven by different energy sources, and establish the objective function for minimum carbon emissions;

Step 7: Use the optimization algorithm to solve the objective function for minimum carbon emissions and determine the natural gas pipeline operation plan based on the minimum carbon emission target according to the result.

Preferably, in the Step 1, when S=0, it indicates that the communication valve between two pipes is closed and there is no flow distribution in the pipe; and when S=1, it indicates that the communication valve between two pipes is opened and there is flow distribution between the pipes.

Preferably, in the Step 2, the outlet pressure and outlet temperature of the compressor station are respectively calculated according to the following equations:

$$P_{out} = P_{in}(\frac{HM_w}{ZRT_{in}}\frac{k-1}{k}+1)^{\frac{k}{k-1}} \quad (2)$$

$$T_{out} = T_{in}\left(1+\frac{1}{k_t}\times\left(\left(\frac{P_{out}}{P_{in}}\right)^{\frac{k-1}{k}}-1\right)\right) \quad (3)$$

Where, $P_{out}$ is the outlet pressure of compressor, in MPa; $P_{in}$ is the inlet pressure of compressor, in MPa; H is the polytropic head of compressor; $M_w$ is the molecular weight of gas, in kg $mol^{-1}$; k is the polytropic index of gas; Z is the compressibility factor of natural gas; R is the gas constant, in J $mol^{-1}$ $K^{-1}$; $T_{in}$ is the inlet temperature of compressor, in K; $T_{out}$ is the outlet temperature of compressor, in K; $k_t$ is the temperature rise coefficient.

Preferably, in the Step 3, the terminal temperature and terminal pressure of the next pipe section are respectively calculated according to the following equations:

$$T_Z = T_0 + (T_Q - T_0)e^{-\alpha L} \quad (4)$$

$$\alpha = \frac{K\pi D}{Mc_p} \quad (5)$$

$$P_Z = \sqrt{P_Q^2(1-a\Delta S) - bM^2L(1-\frac{a\Delta S}{2})} \quad (6)$$

-continued $$a = \frac{2g}{ZRT_{cp}} \quad (7)$$

$$b = \frac{16\lambda ZRT_{cp}}{\pi^2 D^5} \quad (8)$$

Where, $T_Z$ is the terminal temperature of gas pipeline, in K; $T_0$ is the ground temperature at the buried depth of pipeline, in K; $T_Q$ is the inlet temperature of gas pipeline, in K; α is the intermediate parameter; L is the length of calculated section of the gas pipeline, in m; K is the total heat transfer coefficient of pipeline, in W/(m²·K); D is the outer diameter of pipeline, in m; M is the mass flow of gas, in kg/s; $c_p$ is the specific heat capacity of mass-constant pressure of gas, in J/(kg·K); $P_Z$ is the terminal pressure of gas pipeline, in Pa; $P_Q$ is the inlet pressure of gas pipeline, in Pa; a and b are intermediate parameters; ΔS is the difference of elevation between end point and starting point, in m; g is the gravitational acceleration, in m/s²; Z is the compressibility factor of natural gas; R is the gas constant, in J mol⁻¹ K⁻¹; $T_{cp}$ is the average temperature of gas pipeline, in K; λ is the hydraulic friction coefficient.

Preferably, in the Equation (8), the hydraulic friction coefficient is calculated through the following equation:

$$\frac{1}{\sqrt{\lambda}} = -2.01 \cdot lg\left(\frac{k'}{3.71d} + \frac{2.51}{Re\sqrt{\lambda}}\right) \quad (9)$$

Where, lg is the log function; k' is the absolute equivalent roughness of pipe wall, in mm; d is the inner diameter of pipeline, in m; Re is the Reynolds number.

Preferably, in the Step 5, the constraint conditions comprise:
(1) Constraint on Compressor Speed $$R_{min} \leq R_n \leq R_{max} \quad (10)$$

Where, $R_{min}$ is the minimum rotating speed of compressor, in l/min; $R_n$ is the rotating speed of compressor in the Compressor Station n; $R_{max}$ is the maximum rotating speed of compressor, in l/min;
(2) Constraint on Pipeline Pressure $$P_{m\,min} \leq P_m \leq P_{m\,max} \ (m=1,2,\ldots,N_m) \quad (11)$$

Where, $P_{m\,min}$ is the minimum allowable pressure of the node m, in MPa; $P_m$ is the pressure of the node m, in MPa; $P_{m\,max}$ is the maximum allowable pressure of the node m, in MPa; $N_m$ is the total number of pipe nodes;
(3) Constraint on Flow Balance $$\sum_{k \in C_{m,3}}^{N_m} \alpha_{mk} M_{lmk} + \sum_{m=1}^{N_m} M_{2m} - \sum_{j=1}^{N_j} C_{gj} = 0 \quad (12)$$

Where, $C_m$ is the set of components connected to the node m; $\alpha_{mk}$ is the coefficient, which is +1 when the component k flows into the node m, and −1 when the component k flows out of the node m; $M_{lmk}$ is the absolute value of flow when the component k connected to the node m flows into/out of the node m, in m³; $M_{2m}$ is the flow when the node m exchanges with the outside, which is positive in case of inflow and negative in case of outflow, in m³; $C_{gj}$ is the natural gas mass of gas consumption of the compressor station j, in m³;

(4) Constraint on Compressor Power $$N_{w\text{-}min} \leq N_w \leq N_{w\text{-}max} \quad (13)$$

Where, $N_{w\text{-}min}$ is the minimum allowable power of compressor, in MW; $N_w$ is the allowable power of compressor, in MW; $N_{w\text{-}max}$ is the maximum allowable power of compressor, in MW;
Or constraint on carbon emissions of compressor $$C_{min} \leq C \leq C_{max} \quad (14)$$

Where, $C_{min}$ is the minimum carbon emission of compressor, in kg $CO_2$; C is the carbon emissions of compressor, in kg $CO_2$; $C_{max}$ is the maximum carbon emissions of compressor, in kg $CO_2$;
(5) Constraint on Outlet Temperature of Compressor $$T_{out} < T_{out\,max} \quad (15)$$

Where, $T_{out}$ is the outlet temperature of compressor, in K; and $T_{out\,max}$ is the maximum outlet temperature of compressor, in K.

Preferably, in the Step 5, the gas consumption of gas driven compressor in the pipeline system is calculated through the following equation:

$$C_g = \frac{N_g t_g}{\eta_g} g_e \quad (16)$$

Where, $C_g$ is the gas consumption of fuel driven compressor in the pipeline system, in Nm³; Ng is the power of gas driven compressor unit in the compressor station, in kW; $t_g$ is the running time of gas driven compressor unit, in h; $\eta_g$ is the efficiency of compressor driven gas turbine in the compressor station; $g_e$ is the gas consumption rate of gas turbine, in Nm³/(kWh);

The power consumption of electric driven compressor is calculated through the following equation:

$$C_e = \frac{N_e t_e}{\eta_e} \quad (17)$$

Where, $C_e$ is the power consumption of electric driven compressor, in kWh; $N_e$ is the power of electric driven compressor in the compressor station, in kW; $t_e$ is the running time of electric driven compressor unit, in h; $\eta_e$ is the efficiency of compressor driven motor in the compressor station.

Preferably, in the Step 6, when the objective function for minimum carbon emissions is established, the following conditions are assumed: the gas flow in the pipeline is steady and the flow is equally distributed between compressors in each compressor station; and the objective function for minimum carbon emissions is shown as follows:

$$\min C_1 = \min \sum_{i=1}^{N_i} \sum_{j=1}^{j=N_j} \varepsilon_g C_{i,g}^j + \sum_{i=1}^{N_i} \sum_{k=1}^{k=N_k} \varepsilon_e C_{i,e}^k \quad (18)$$

$$\min C_2 = \min \sum_{i=1}^{N_i} \sum_{j=1}^{j=N_j} \varepsilon_g C_{i,g}^j + \sum_{i=1}^{N_i} \sum_{u=1}^{u=N_u} \varepsilon_{ne} C_{i,ne}^u \quad (19)$$

Where, min $C_1$ is the objective function for minimum carbon emissions for the pipeline containing the gas driven compressor and the electric driven compressor; min $C_2$ is the objective function for minimum carbon emissions for the pipeline containing the gas driven compressor and the new energy driven compressor; $N_i$ is the total number of pipes; $N_j$ is the total number of gas driven compressors; $N_k$ is the total number of electric driven compressors; Nu is the total number of new energy driven compressors; $\varepsilon_g$ is the carbon emission coefficient of natural gas, in kg $CO_2/m^3$; $\varepsilon_e$ is the carbon emission coefficient of power grid, in kg $CO_2/kWh$; $\varepsilon_{ne}$ is the carbon emission coefficient of new energy; $C_{i,g}^j$ is the gas consumption of the gas driven compressor j on the pipe i; $C_{i,e}^j$ is the power consumption of the electric driven compressor k on the pipe i; $C_{i,ne}^u$ is the energy consumption of the new energy driven compressor u on the pipe i.

Preferably, the new energy driven compressor includes the wind power driven compressor and/or photoelectricity driven compressor; and the objective function min $C_2$ for minimum carbon emissions is as follows:

$$\min C_2 = \min \sum_{i=1}^{N_i} \sum_{j=1}^{j=N_j} \varepsilon_g C_{i,g}^j + \sum_{i=1}^{N_i} \sum_{w=1}^{w=N_w} \varepsilon_{e1} C_{i,e}^w + \sum_{i=1}^{N_i} \sum_{l=1}^{l=N_l} \varepsilon_{e2} C_{i,e}^l \quad (20)$$

Where, $N_w$ is the total number of wind power driven compressors; $N_l$ is the total number of photoelectricity driven compressors; $\varepsilon_{e1}$ is the carbon emission coefficient of wind energy, in kg $CO_2/kWh$; $\varepsilon_{e2}$ is the carbon emission coefficient of photoelectricity, in kg $CO_2/kWh$; $C_{i,e}^w$ is the power consumption of the wind power driven compressor w on the pipe i; $C_{i,e}^l$ is the power consumption of the photoelectricity driven compressor l on the pipe i.

Preferably, the carbon emission coefficient of natural gas adopts the carbon emission factor of natural gas, the carbon emission coefficient of power grid adopts the average emission factor of regional power grid, and the carbon emission coefficient of new energy adopts the carbon footprint-based power grid emission factor of new energy. The beneficial effects of the present invention are as follows:

From the perspective of energy structure adjustment, the present invention proposes a complete low-carbon and low-consumption optimization model of long-distance natural gas transmission network, which is used for fine calculation of multi-energy carbon emissions and energy consumption in the transportation process of natural gas pipeline network; according to different energy structure backgrounds, the corresponding objective function for minimum carbon emissions is established, the optimization algorithm is adopted to solve the objective function for minimum carbon emissions and work out the optimal scheduling scheme, so as to realize energy conservation and emission reduction in the process of pipeline transportation and provide technical support for achieving the target of "peak carbon dioxide emissions and carbon neutrality" in the entire natural gas industry of China as early as possible.

BRIEF DESCRIPTION OF DRAWINGS

In order to explain the embodiments of the present invention or the technical solutions in the prior art more clearly, the following will make a brief introduction to the drawings needed in the description of the embodiments or the prior art. Obviously, the drawings in the following description are merely some embodiments of the present invention. For those of ordinary skill in the art, other drawings can be obtained based on the structures shown in these drawings without any creative effort.

DETAILED DESCRIPTION OF THE EMBODIMENTS

The present invention is further described with reference to the drawings and embodiments. It should be noted that the embodiments in this application and the technical features in the embodiments can be combined with each other without conflict. It is to be noted that, unless otherwise specified, all technical and scientific terms herein have the same meaning as commonly understood by those of ordinary skill in the art to which this application belongs. "Include" or "comprise" and other similar words used in the present disclosure mean that the components or objects before the word cover the components or objects listed after the word and its equivalents, but do not exclude other components or objects.

Figure 1:
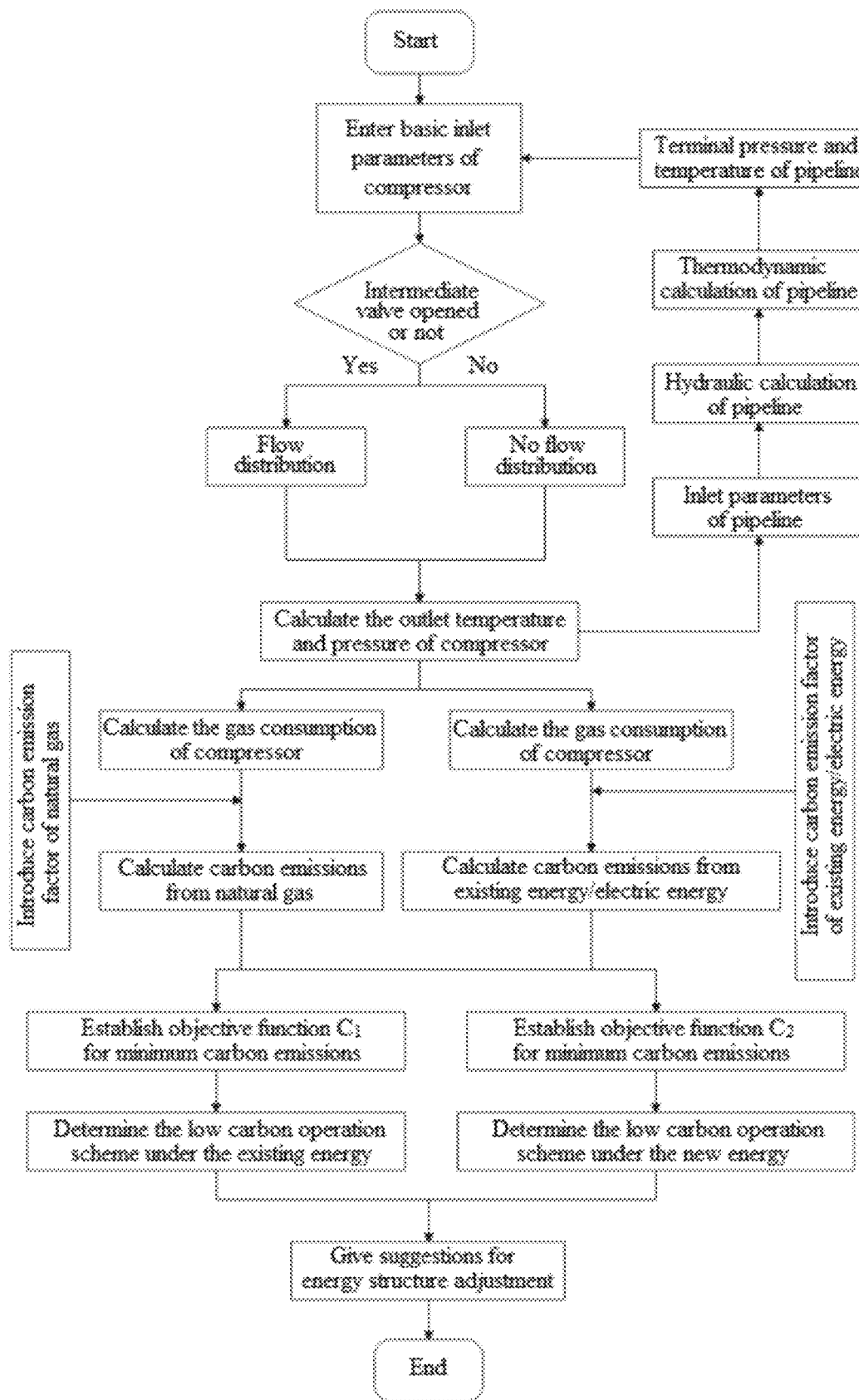
FIG. 1 is the process diagram of optimization method for natural gas pipeline operation under the carbon neutrality target of the present invention.

As shown in FIG. 1, the present invention provides an optimization method for natural gas pipeline operation under the carbon neutrality target, including the following steps:

Step 1: Determine the type of decision variable, and obtain the initial inlet parameters of compressor station; the decision variable is as follows:

$$X=(Q,N,R,S) \tag{1}$$

Where, X is the decision variable; Q is the pipeline transmission capacity, in m³/s; N is the number of compressors started in each compressor station; R is the rotating speed of compressor, in l/min; S is the connection status between two pipelines.

In a specific embodiment, when S=0, it indicates that the communication valve between two pipes is closed and there is no flow distribution in the pipe; and when S=1, it indicates that the communication valve between two pipes is opened and there is flow distribution between the pipes. It should be noted that other numbers can also be used for expressing the status of communication valve in the other embodiments.

Step 2: Judge the connection status between two pipes, determine the flow of each pipe according to the connection status, and then calculate the outlet pressure and outlet temperature of the compressor station.

In a specific embodiment, the outlet pressure and outlet temperature of the compressor station are respectively calculated according to the following equations:

$$P_{out} = P_{in}\left(\frac{HM_w}{ZRT_{in}}\frac{k-1}{k}+1\right)^{\frac{k}{k-1}} \tag{2}$$

$$T_{out} = T_{in}\left(1+\frac{1}{k_t}\times\left(\left(\frac{P_{out}}{P_{in}}\right)^{\frac{k-1}{k}}-1\right)\right) \tag{3}$$

Where, $P_{out}$ is the outlet pressure of compressor, in MPa; $P_{in}$ is the inlet pressure of compressor, in MPa; H is the polytropic head of compressor; $M_w$ is the molecular weight of gas, in kg mol⁻¹; k is the polytropic index of gas; Z is the compressibility factor of natural gas; R is the gas constant, in J mol⁻¹ K⁻¹; $T_{in}$ is the inlet temperature of compressor, in K; $T_{out}$ is the outlet temperature of compressor, in K; $k_t$ is the temperature rise coefficient.

In a specific embodiment, the polytropic index k of gas is taken as 1.28, and the temperature rise coefficient $k_t$ is taken as 0.8.

Step 3: Make the outlet pressure of compressor station equal to the inlet pressure of the next pipe section and the outlet temperature of compressor station equal to the inlet temperature of the next pipe section, and then calculate the terminal temperature and terminal pressure of the next pipe section.

In a specific embodiment, the terminal temperature (thermodynamic calculation of pipe in FIG. 1) and terminal pressure (hydraulic calculation of pipe in FIG. 1) of the next pipe section are respectively calculated according to the following equations:

$$T_Z = T_0 + (T_Q - T_0)e^{-\alpha L} \tag{4}$$

$$\alpha = \frac{K\pi D}{Mc_p} \tag{5}$$

$$P_Z = \sqrt{P_Q^2(1-a\Delta S)-bM^2L(1-\frac{a\Delta S}{2})} \tag{6}$$

$$a = \frac{2g}{ZRT_{cp}} \tag{7}$$

$$b = \frac{16\lambda ZRT_{cp}}{\pi^2 D^5} \tag{8}$$

Where, $T_Z$ is the terminal temperature of gas pipeline, in K; $T_0$ is the ground temperature at the buried depth of pipeline, in K; $T_Q$ is the inlet temperature of gas pipeline, in K; $\alpha$ is the intermediate parameter; L is the length of calculated section of the gas pipeline, in m; K is the total heat transfer coefficient of pipeline, in W/(m²·K); D is the outer diameter of pipeline, in m; M is the mass flow of gas, in kg/s; $c_p$ is the specific heat capacity of mass-constant pressure of gas, in J/(kg·K); $P_Z$ is the terminal pressure of gas pipeline, in Pa; $P_Q$ is the inlet pressure of gas pipeline, in Pa; a and b are intermediate parameters; $\Delta S$ is the difference of elevation between end point and starting point, in m; g is the gravitational acceleration, in m/s²; Z is the compressibility factor of natural gas; R is the gas constant, in J mol⁻¹ K⁻¹; $T_{cp}$ is the average temperature of gas pipeline, in K; $\lambda$ is the hydraulic friction coefficient.

It should be noted that in the actual long transmission pipeline, the pipeline is long and the elevation difference between many stations exceeds 200 m. However, in the above embodiment, Equation (6) is adopted to calculate the terminal pressure of the next pipe section, which takes into account the influence of elevation difference and topography, making the calculation result more accurate and in line with the reality.

In a specific embodiment, in the Equation (8), the hydraulic friction coefficient is calculated through the following equation:

$$\frac{1}{\sqrt{\lambda}} = -2.01\cdot lg\left(\frac{k'}{3.71d}+\frac{2.51}{Re\sqrt{\lambda}}\right) \tag{9}$$

Where, lg is the log function; k' is the absolute equivalent roughness of pipe wall, in mm; d is the inner diameter of pipeline, in m; Re is the Reynolds number.

It should be noted that, for the main gas transmission pipeline, the flow state in the pipe is basically in the square region of resistance. The calculation accuracy of hydraulic friction coefficient can be improved by using the Equation (9) in the above embodiment.

Step 4: Make the terminal pressure of the previous pipe section equal to the inlet pressure of compressor station at the next section and the terminal temperature of the previous pipe section equal to the inlet temperature of compressor station at the next section. Repeat the Steps 2 to 4 until the pressure and temperature changes of each compressor station in the system are calculated.

Step 5: Set the constraint conditions and calculate the gas consumption of gas driven compressor and the power consumption of electric driven compressor in the pipeline system.

In a specific embodiment, the constraint conditions include:

(1) Constraint on Compressor Speed $$R_{min} \leq R_n \leq R_{max} \quad (10)$$

Where, $R_{min}$ is the minimum rotating speed of compressor, in l/min; $R_n$ is the rotating speed of compressor in the Compressor Station n; $R_{max}$ is the maximum rotating speed of compressor, in l/min;

(2) Constraint on Pipeline Pressure $$P_{m\ min} \leq P_m \leq P_{m\ max} \quad (m=1,2,\ldots,N_m) \quad (11)$$

Where, $P_{m\ min}$ is the minimum allowable pressure of the node m, in MPa; $P_m$ is the pressure of the node m, in MPa; $P_{m\ max}$ is the maximum allowable pressure of the node m, in MPa; $N_m$ is the total number of pipe nodes;

(3) Constraint on Flow Balance $$\sum_{k \in C_{m'}}^{N_m} \alpha_{mk} M_{1mk} + \sum_{m=1}^{N_m} M_{2m} - \sum_{j=1}^{N_j} C_{gj} = 0 \quad (12)$$

Where, $C_m$ is the set of components connected to the node m; $\alpha_{mk}$ is the coefficient, which is +1 when the component k flows into the node m, and −1 when the component k flows out of the node m; $M_{lmk}$ is the absolute value of flow when the component k connected to the node m flows into/out of the node m, in m³; $M_{2m}$ is the flow when the node m exchanges with the outside, which is positive in case of inflow and negative in case of outflow, in m³; $C_{gj}$ is the natural gas mass of gas consumption of the compressor station j, in m³;

(4) Constraint on Compressor Power $$N_{w\text{-}min} \leq N_w \leq N_{w\text{-}max} \quad (13)$$

Where, $N_{w\text{-}min}$ is the minimum allowable power of compressor, in MW; $N_w$ is the allowable power of compressor, in MW; $N_{w\text{-}max}$ is the maximum allowable power of compressor, in MW;

Or constraint on carbon emissions of compressor $$C_{min} \leq C \leq C_{max} \quad (14)$$

Where, $C_{min}$ is the minimum carbon emission of compressor, in kg $CO_2$; C is the carbon emissions of compressor, in kg $CO_2$; $C_{max}$ is the maximum carbon emissions of compressor, in kg $CO_2$;

(5) Constraint on Outlet Temperature of Compressor $$T_{out} < T_{out\ max} \quad (15)$$

Where, $T_{out}$ is the outlet temperature of compressor, in K; and $T_{out\ max}$ is the maximum outlet temperature of compressor, in K.

In a specific embodiment, the gas consumption of gas driven compressor in the pipeline system is calculated through the following equation:

$$C_g = \frac{N_g t_g}{\eta_g} g_e \quad (16)$$

Where, $C_g$ is the gas consumption of fuel driven compressor in the pipeline system, in Nm³; Ng is the power of gas driven compressor unit in the compressor station, in kW; $t_g$ is the running time of gas driven compressor unit, in h; $\eta_g$ is the efficiency of compressor driven gas turbine in the compressor station; $g_e$ is the gas consumption rate of gas turbine, in Nm³/(kWh);

The power consumption of electric driven compressor is calculated through the following equation:

$$C_e = \frac{N_e t_e}{\eta_e} \quad (17)$$

Where, $C_e$ is the power consumption of electric driven compressor, in kWh; $N_e$ is the power of electric driven compressor in the compressor station, in kW; $t_e$ is the running time of electric driven compressor unit, in h; ne is the efficiency of compressor driven motor in the compressor station.

Step 6: Introduce the carbon emission coefficient, calculate the carbon emissions of compressors driven by different energy sources, and establish the objective function for minimum carbon emissions.

In a specific embodiment, when the objective function for minimum carbon emissions is established, the following conditions are assumed: the gas flow in the pipeline is steady and the flow is equally distributed between compressors in each compressor station; and the objective function for minimum carbon emissions is shown as follows:

$$\min C_1 = \min \sum_{i=1}^{N_i} \sum_{j=1}^{j=N_j} \varepsilon_g C_{i,g}^j + \sum_{i=1}^{N_i} \sum_{k=1}^{k=N_k} \varepsilon_e C_{i,e}^k \quad (18)$$

$$\min C_2 = \min \sum_{i=1}^{N_i} \sum_{j=1}^{j=N_j} \varepsilon_g C_{i,g}^j + \sum_{i=1}^{N_i} \sum_{u=1}^{u=N_u} \varepsilon_{ne} C_{i,ne}^u \quad (19)$$

Where, min $C_1$ is the objective function for minimum carbon emissions for the pipeline containing the gas driven compressor and the electric driven compressor; min $C_2$ is the objective function for minimum carbon emissions for the pipeline containing the gas driven compressor and the new energy driven compressor; $N_i$ is the total number of pipes; $N_j$ is the total number of gas driven compressors; $N_k$ is the total number of electric driven compressors; Nu is the total number of new energy driven compressors; $\varepsilon_g$ is the carbon emission coefficient of natural gas, in kg $CO_2$/m³; $\varepsilon_e$ is the carbon emission coefficient of power grid, in kg $CO_2$/kWh; $\varepsilon_{ne}$ is the carbon emission coefficient of new energy; $C_{i,g}^j$ is the gas consumption of the gas driven compressor j on the pipe i; $C_{i,e}^j$ is the power consumption of the electric driven compressor k on the pipe i; $C_{i,ne}{}^u$ is the energy consumption of the new energy driven compressor u on the pipe i;

Optionally, the new energy driven compressor includes the wind power driven compressor and/or photoelectricity driven compressor; and the objective function min $C_2$ for minimum carbon emissions is as follows:

$$\min C_2 = \min \sum_{i=1}^{N_i} \sum_{j=1}^{j=N_j} \varepsilon_g C_{i,g}^j + \sum_{i=1}^{N_i} \sum_{w=1}^{w=N_w} \varepsilon_{e1} C_{i,e}^w + \sum_{i=1}^{N_i} \sum_{l=1}^{l=N_l} \varepsilon_{e2} C_{i,e}^l \quad (20)$$

Where, $N_w$ is the total number of wind power driven compressors; $N_l$ is the total number of photoelectricity driven compressors; $\varepsilon_{e1}$ is the carbon emission coefficient of wind energy, in kg $CO_2$/kWh; $\varepsilon_{e2}$ is the carbon emission coefficient of photoelectricity, in kg $CO_2$/kWh; $C_{i,e}^w$ is the power consumption of the wind power driven compressor w on the pipe i; $C_{i,e}^l$ is the power consumption of the photoelectricity driven compressor l on the pipe i;

It should be noted that the present invention reduces the carbon emissions in the transportation process of natural gas pipeline by introducing new energy with lower carbon emissions. Wind power and photoelectricity in the above embodiment are only the two preferred new energy sources with lower carbon emissions than the existing power grid. In addition, the present invention can also select other locally applicable new energy sources with lower carbon emissions according to the location and environment of the natural gas pipeline.

Optionally, the carbon emission coefficient of natural gas adopts the carbon emission factor of natural gas, the carbon emission coefficient of power grid adopts the average emission factor of regional power grid, and the carbon emission coefficient of new energy adopts the carbon footprint-based power grid emission factor of new energy. It should be noted that there are many carbon emission factors at present, including carbon footprint-based power grid emission factor, average emission factor of regional power grid, regional power grid baseline emission factor, regional power grid baseline emission factor for grid-connected power generation of fossil fuels with low-carbon technology in China, and provincial power grid emission factor, etc. Different carbon emission factors have their own characteristics, and the calculation result of objective function for minimum carbon emissions also varies from different carbon emission factors. In this embodiment, the corresponding carbon emission factors selected for different energy sources can make the calculation result of objective function for minimum carbon emissions more accurate.

Step 7: Use the optimization algorithm to solve the objective function for minimum carbon emissions and determine the natural gas pipeline operation plan based on the minimum carbon emission target according to the result.

In a specific embodiment, particle swarm optimization algorithm is used, which is simple and easy to realize and doesn't have many parameters to be adjusted and can solve the result more efficiently.

Optionally, NHPSO-JTVAC algorithm is used, which refers to a new self-organizing hierarchical particle swarm optimization algorithm with jump time-varying acceleration coefficient. This algorithm is upgraded from another improved particle swarm optimization algorithm (HPSO-TVAC). Relative to the traditional particle swarm optimization algorithm, PSO mainly has two different aspects.

(1) Different Calculation Methods for Learning Factor

In the traditional particle swarm optimization algorithm, the learning factor is usually a fixed value. However, the fixed value will make the local and global search ability of particle swarm optimization algorithm insufficient. The determination method in NHPSO-JTVAC algorithm is as follows:

$$c^{Iter} = (c_f - c_i) * \frac{Iter}{Iter_{max}} + c_i \quad (21)$$

$$c_1^{Iter} = |w|^{(c^{Iter} * w)} \quad (22)$$

$$c_2^{Iter} = |1 - w|^{\left(\frac{c^{Iter}}{1-w}\right)} \quad (23)$$

Where, w is a standard normal random number; $c^{Iter}$ will change from $c^I = c_i = 0.5$ to $c^{Iter\ max} = c_f = 0.0$. The Equations (21) to (23) show that the two learning factors are of exponential type, making the algorithm easier to jump out of the local optimum in the calculation process, and increasing the search area of the algorithm.

(2) Different Equations for Update Rate

The velocity calculation formula for the traditional particle swarm optimization algorithm is easy to make the algorithm fall into local optimum. Therefore, Ghasemi, et al introduced the optimal individual value of random particles in NHPSO-JTVAC algorithm and replaced the original one, so that the velocity formula was deformed as follows:

$$v_{i,j}^{Iter+1} = c_1^{Iter} \times r_{1,j} \times (p_{i,j}^{Iter} - x_{i,j}^{Iter}) + c_2^{Iter} \times r_{2,j} \times ((p_{g,j}^{Iter} + p_{r,j}^{Iter}) - 2 * x_{i,j}^{Iter}) \quad (24)$$

Ghasemi verified that the improved velocity updating formula can avoid premature convergence of optimization algorithm to the local optimal value and improve the quality of the final solution.

It should be noted that the optimization algorithm of the invention is mainly for solving the objective function of the minimum carbon emission. In addition to the NHPSO-JTVAC algorithm of the above embodiment, other particle swarm optimization algorithms or other optimization algorithms in other existing technologies can be also adopted.

In a specific embodiment, by taking the western pipe section of the lines 2 and 3 of China's West-East Natural Gas Transmission Project as an example, the optimization method for natural gas pipeline operation under the carbon neutrality target described in the present invention is adopted to optimize the operation of natural gas pipeline.

Figure 2:
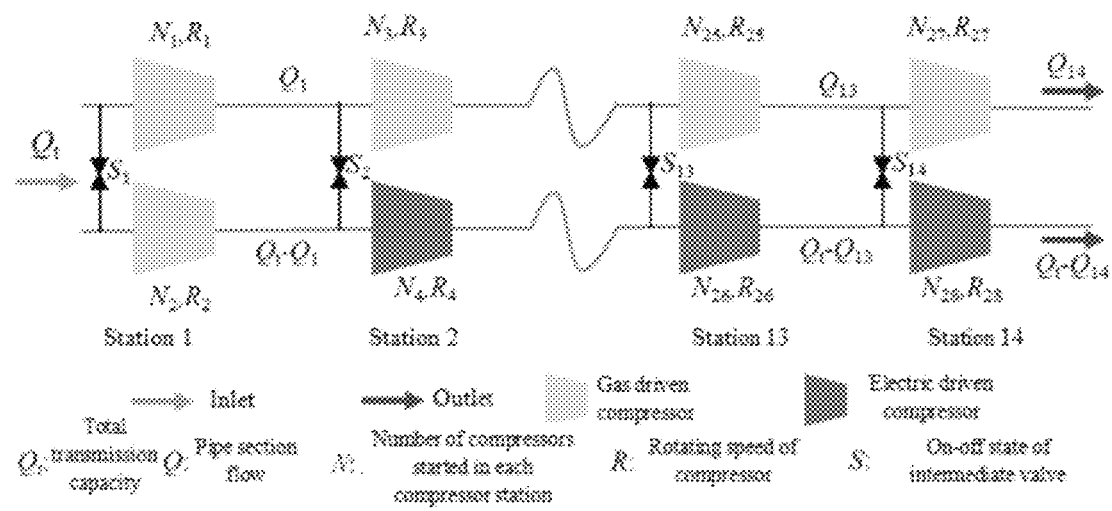
FIG. 2 is the parallel pipe network diagram of the lines 2 and 3 of West-East Natural Gas Transmission Project in a specific embodiment.

As shown in FIG. 2, this pipe section is characterized by parallel laying of two pipelines, joint construction of compressor stations of the two pipelines and provision of electric driven compressor and gas driven compressor in the pipeline system. In addition, the pipeline will pass through Xinjiang and Gansu of China. Due to climate factors, under the guidance of policies, Xinjiang will vigorously develop wind power and Gansu will vigorously develop photoelectricity. The fixed energy consumption and carbon emissions of different energy sources are shown in Table 1:

Table 1 Comparison table of fixed energy consumption and carbon emissions of wind power and photoelectricity

TABLE 1

Comparison table of fixed energy consumption and carbon emissions of wind power and photoelectricity

| Datum 1 | Natural gas ($m^3$) | Gas emissions (kg $CO_2$) | Electric energy (kWh) | Electric emissions (kg $CO_2$) |
|---|---|---|---|---|
| 1tce | 751.88 | 1625.71 | 8136.70 | 5427.99 |
| Datum 2 | Natural gas ($m^3$) | Natural gas converted to standard coal (tce) | Electric energy (kWh) | Electric energy converted to standard coal (tce) |
| $1tCO_2$ | 426.49 | 0.615 | 1499.03 | 0.184 |
| Datum 1 | Wind-electric energy (kWh) | Carbon emissions from wind power- electric energy (kg $CO_2$) | Photoelectricity- electric energy (kWh) | Carbon emissions from photoelectricity- electric energy (kg $CO_2$) |
| 1tce | 8136.70 | 91.13 | 8136.70 | 572.82 |
| Datum 2 | Wind power-electric energy (kWh) | Wind power-electric energy converted to standard coal (tce) | Photoelectricity-electric energy (kWh) | Photoelectricity-electric energy converted to standard coal (tce) |
| $1tCO_2$ | 89285.71 | 10.97 | 14204.55 | 1.75 |

Seen from Table 1, the carbon emissions of electricity are higher when generating the same energy (Datum 1). Therefore, to reduce carbon emissions, the use of electric energy should be reduced. For the same $CO_2$ emission (Datum 2), natural gas produces more energy. Therefore, when the energy required by the system is constant, the consumption of natural gas needs to be increased. It can be seen that there is a need to increase the consumption of natural gas and reduce the consumption of electric energy in view of carbon emissions or energy consumption. When wind power and photoelectricity produce the same energy consumption (Datum 1), the $CO_2$ emission is less than that of natural gas. When wind power and photoelectricity emit the same amount of $CO_2$ (Datum 2), the energy produced is much larger than that produced by natural gas.

To sum up, in this embodiment, the introduction of wind power and photoelectricity into the natural gas transmission system can greatly reduce the $CO_2$ emissions. Therefore, in the operation process of parallel pipe network system, it is necessary to establish the objective function min $C_1$ for minimum carbon emissions (Equation (18)) using the existing energy structure and the objective function min $C_2$ for minimum carbon emissions (Equation (20)) introducing the new energy.

Figure 3:
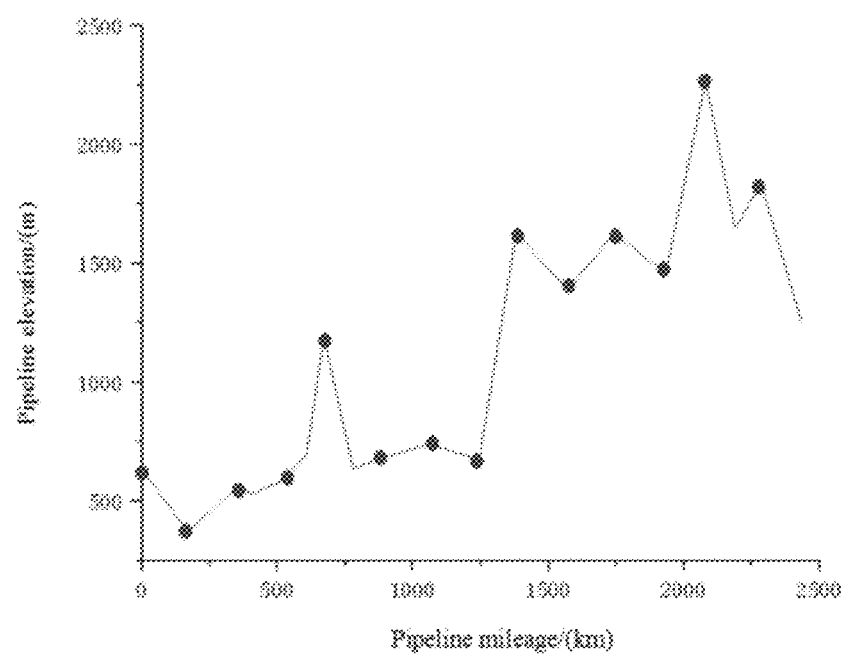
FIG. 3 is the elevation-mileage result diagram of the lines 2 and 3 of West-East Natural Gas Transmission Project in a specific embodiment.

There are 14 compressor stations at the western pipe section of the lines 2 and 3 of West-East Natural Gas Transmission Project in China, where the inner diameter of the pipe is 1.177 m and the trend chart of pipeline is shown in FIG. 3. According to the operation data of the compressor stations obtained from field research, the operation data of the two lines in January of a certain year are shown in Table 2 and Table 3:

TABLE 2

Actual operation data of the west-east line 2 in January of a certain year

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 10.04 | 20.37 | 54.7 | 2 | 13326.03 | Gas driven | Opened |
| 2 | 8.10 | 10.84 | 24.76 | 51.12 | 1 | 6622.86 | Gas driven | Opened |
| 3 | 8.80 | 10.89 | 25.00 | 44.00 | 1 | 4257.58 | Gas driven | Opened |
| 4 | 8.98 | 10.45 | 22.55 | 35.60 | 1 | 3382.53 | Gas driven | Opened |
| 5 | 7.40 | 10.89 | 12.88 | 44.70 | 3 | 15425.00 | Electric driven | Closed |
| 6 | 7.92 | 10.94 | 16.03 | 42.65 | 2 | 12969.13 | Gas driven | Opened |
| 7 | 8.19 | 10.95 | 22.46 | 47.16 | 2 | 10517.14 | Gas driven | Opened |
| 8 | 8.41 | 10.81 | 26.00 | 50.00 | 1 | 2982.66 | Gas driven | Opened |
| 9 | 8.14 | 10.79 | 24.2 | 48.5 | 1 | 14221.24 | Gas driven | Opened |
| 10 | 8.02 | 10.85 | 26.6 | 51.9 | 2 | 18616.48 | Electric driven | Opened |
| 11 | 7.97 | 10.78 | 21.22 | 46.61 | 1 | 5693.25 | Gas driven | Opened |
| 12 | 8.11 | 10.94 | 20.61 | 49.50 | 1 | 5839.12 | Gas driven | Opened |
| 13 | 8.08 | 10.71 | 20.75 | 45.15 | 2 | 17627.30 | Electric driven | Opened |
| 14 | 8.24 | 11.30 | 20.31 | 46.88 | 1 | 5951.70 | Gas driven | Opened |

TABLE 3

Actual operation data of the west-east line 3 in January of a certain year

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 10.06 | 16.80 | 52.00 | 2 | 11904.27 | Gas driven | Opened |
| 2 | 8.22 | 10.97 | 26.3 | 52.5 | 2 | 7989.06 | Electric driven | Opened |
| 3 | 8.82 | 10.91 | 25.52 | 44.13 | 2 | 5382.93 | Electric driven | Opened |

TABLE 3-continued

Actual operation data of the west-east line 3 in January of a certain year

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 4 | 8.96 | 10.43 | 23.01 | 35.81 | 2 | 6765.28 | Electric driven | Opened |
| 5 | 8.91 | 8.91 | 29.23 | 29.60 | 0 | 0 | Electric driven | Closed |
| 6 | 7.89 | 10.95 | 16.00 | 44.00 | 1 | 5145.83 | Gas driven | Opened |
| 7 | 8.19 | 10.95 | 24.00 | 50.00 | 2 | 11347.18 | Gas driven | Opened |
| 8 | 8.39 | 10.88 | 25.40 | 46.70 | 2 | 5951.15 | Gas driven | Opened |
| 9 | 8.12 | 10.79 | 25.12 | 49.62 | 2 | 25941.94 | Gas driven | Opened |
| 10 | 8.01 | 10.79 | 26.2 | 53.9 | 2 | 14784.70 | Electric driven | Opened |
| 11 | 8.00 | 10.78 | 20.84 | 47.6 | 3 | 11331.28 | Electric driven | Opened |
| 12 | 7.79 | 10.88 | 18.80 | 46.96 | 3 | 11692.33 | Electric driven | Opened |
| 13 | 8.22 | 10.32 | 23.30 | 41.70 | 2 | 13088.13 | Electric driven | Opened |
| 14 | 8.08 | 11.35 | 18.7 | 48.2 | 3 | 11227.24 | Electric driven | Opened |

The pressure and temperature changes along the line are calculated according to steps 2 to 4 in the present invention, and the results are shown in FIG. 4-7.

Figure 4:
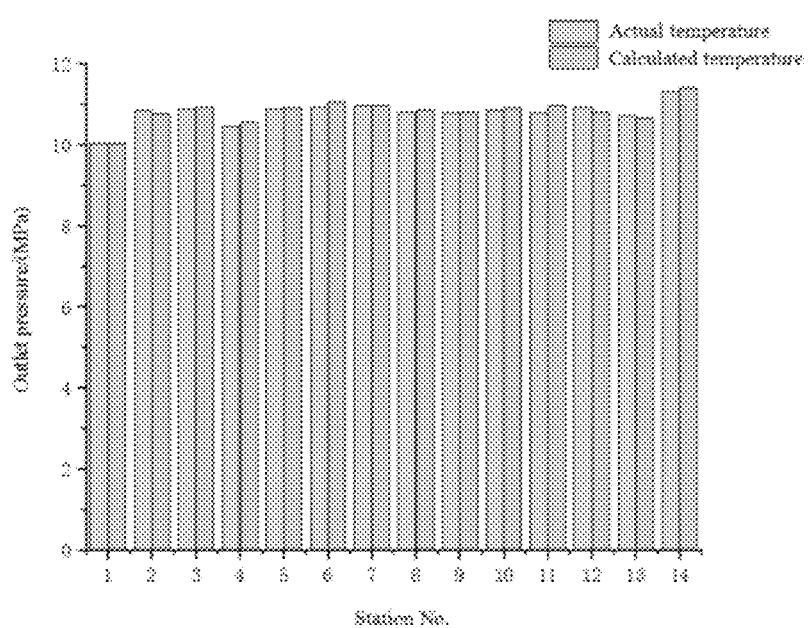
FIG. 4 is the outlet pressure diagram of each station in the line 2 of West-East Natural Gas Transmission Project in a specific embodiment.
Figure 5:
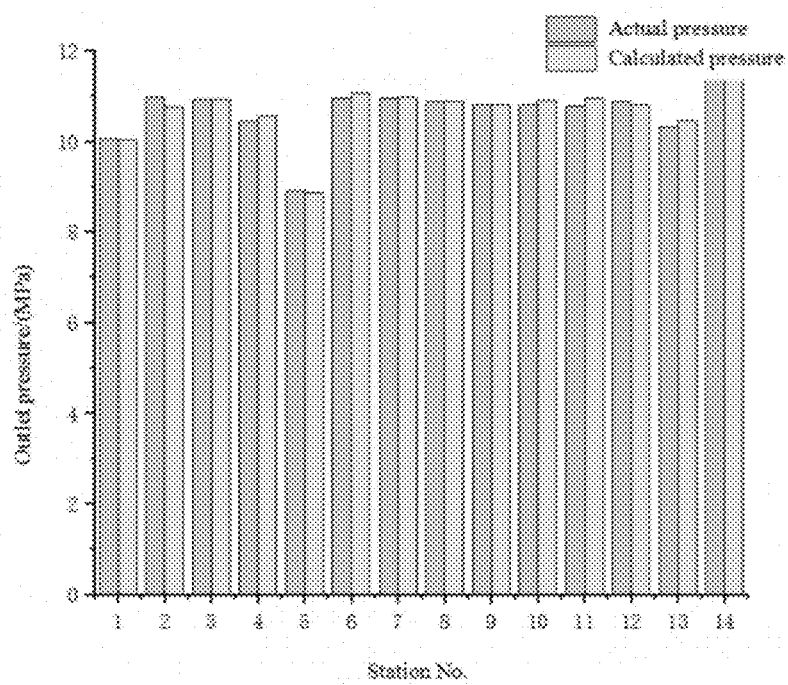
FIG. 5 is the outlet pressure diagram of each station in the line 3 of West-East Natural Gas Transmission Project in a specific embodiment.

Seen from FIG. 4 and FIG. 5, the west-east line 2 has the maximum outlet pressure difference at Station 11, which is 0.17 MPa. In other words, the maximum pressure error of the west-east line 2 is 1.58%. The west-east line 3 has the maximum outlet pressure difference at Station 2, which is 0.21 MPa. In other words, the maximum pressure error of the west-east line 3 is 1.91% and the error between calculated pressure and actual pressure is less than 2%. The pressure calculation model in the present invention meets the accuracy requirements.

Figure 6:
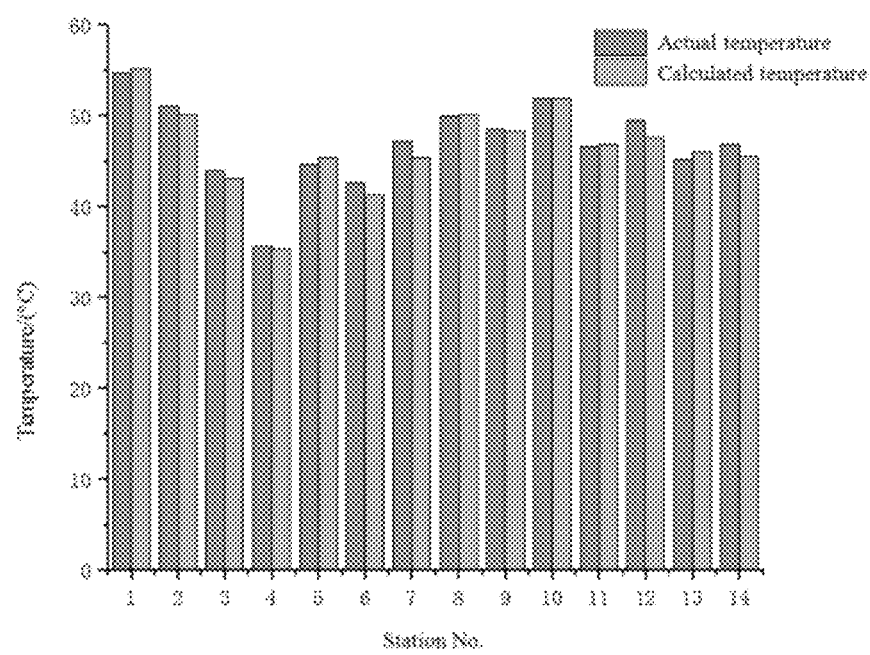
FIG. 6 is the outlet temperature diagram of each station in the line 2 of West-East Natural Gas Transmission Project in a specific embodiment.
Figure 7:
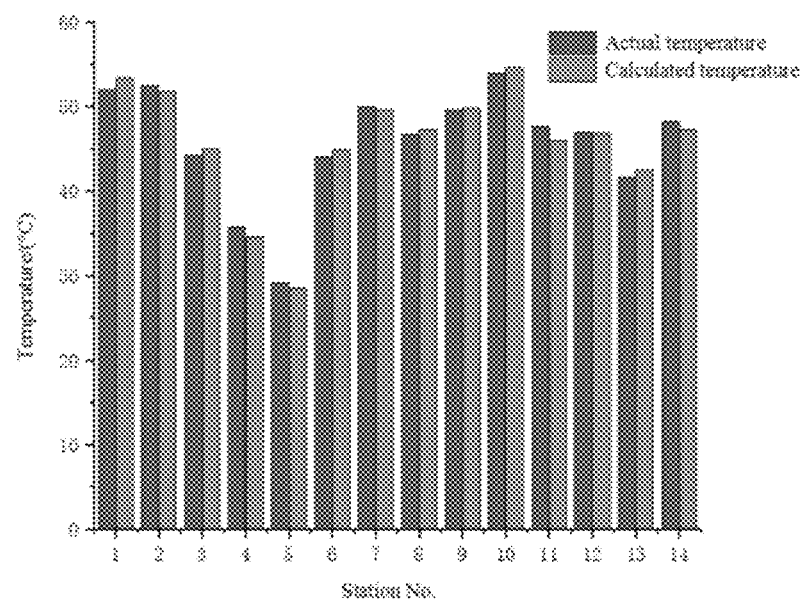
FIG. 7 is the outlet temperature diagram of each station in the line 3 of West-East Natural Gas Transmission Project in a specific embodiment.

Seen from FIG. 6 and FIG. 7, the west-east line 2 has the maximum temperature difference at Station 7, which is 1.79° ° C. In other words, the maximum temperature error of the west-east line 2 is 3.79%. The west-east line 3 has the maximum temperature difference at Station 11, which is 1.61°C. In other words, the maximum temperature error of the west-cast line 3 is 3.38% and the error between calculated temperature and actual temperature is within 2° ° C.

The temperature calculation model in the present invention meets the accuracy requirements.

In a specific embodiment, when the constraint conditions are set in the Step 5, the fourth constraint is about the carbon emissions of compressor in Equation (13). In this embodiment, NHPSO-JTVAC algorithm is used for optimization where the initial population is 50 and the number of iterations is 150. The carbon emission coefficient of natural gas is 2.1622 kg $CO_2/m^3$, the carbon emission coefficient of power grid is 0.6671 kg $CO_2$/kWh (average emission factor of power grid in the northwest region), the carbon emission coefficient of wind power is 0.0112 kg $CO_2$/kWh (carbon footprint-based power grid emission factor) and the carbon emission coefficient of photoelectricity is 0.0704 kg $CO_2$/kWh (carbon footprint-based power grid emission factor).

Figure 8:
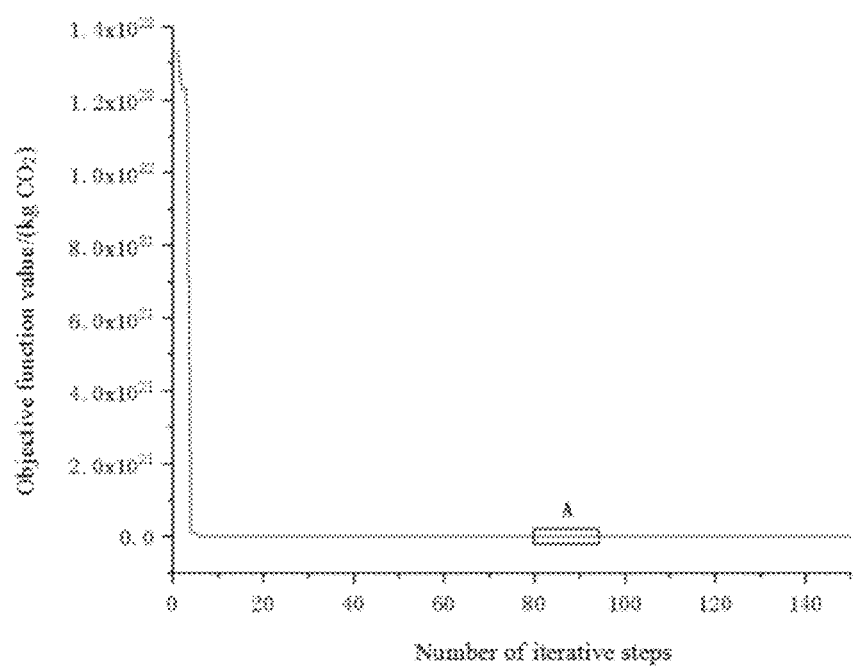
FIG. 8 is the optimization result diagram of Target 1 in the lines 2 and 3 of West-East Natural Gas Transmission Project in a specific embodiment.
Figure 9:
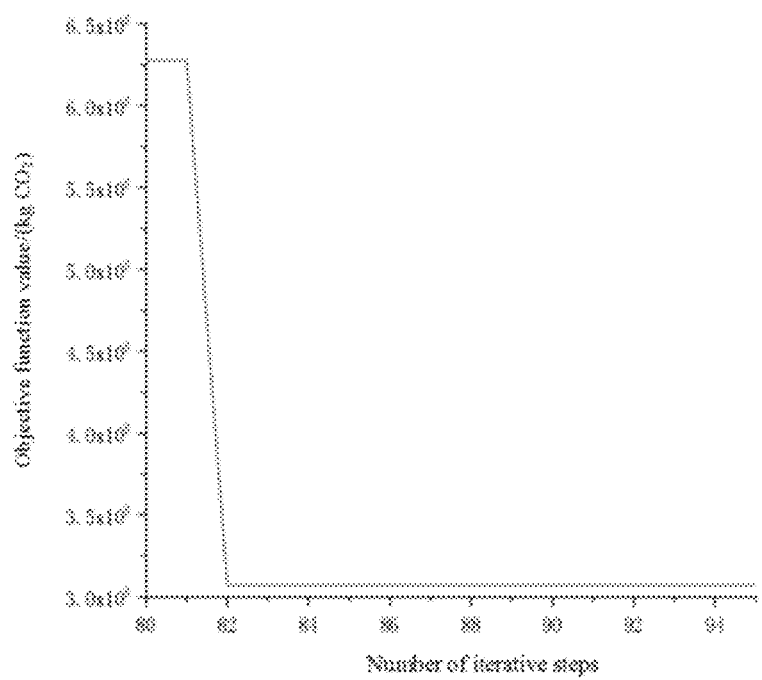
FIG. 9 is the schematic diagram of local enlargement A in FIG. 8.

The optimization results of min $C_1$ are shown in FIG. 8 and FIG. 9, in which the calculation results tend to be stable when the algorithm iterates to 82 steps. After the algorithm optimization results are substituted into the decision variable equation (1), the optimization scheme of Target 1 can be obtained and the results are shown in Table 4 and Table 5:

TABLE 4

Optimization scheme of the west-east line 2 for target 1

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 10.11 | 20.37 | 53.04 | 3 | 12941.54 | Gas driven | Opened |
| 2 | 8.29 | 11.45 | 23.11 | 50.26 | 1 | 6927.49 | Gas driven | Opened |
| 3 | 10.33 | 10.33 | 22.03 | 22.03 | 0 | 0 | Gas driven | Opened |
| 4 | 8.88 | 8.88 | 7.44 | 7.44 | 0 | 0 | Gas driven | Opened |
| 5 | 6.70 | 11.66 | 6.51 | 51.56 | 2 | 20207.96 | Electric driven | Closed |
| 6 | 10.42 | 10.42 | 33.49 | 33.49 | 0 | 0 | Gas driven | Closed |
| 7 | 7.98 | 10.69 | 26.54 | 51.19 | 2 | 11552.39 | Gas driven | Closed |
| 8 | 8.42 | 9.74 | 29.52 | 41.79 | 2 | 7486.64 | Gas driven | Opened |
| 9 | 7.26 | 10.25 | 23.48 | 52.51 | 2 | 19518.61 | Gas driven | Opened |
| 10 | 8.00 | 11.11 | 30.19 | 58.42 | 3 | 15645.27 | Electric driven | Opened |
| 11 | 8.78 | 11.07 | 40.51 | 60.88 | 2 | 9343.91 | Gas driven | Opened |
| 12 | 9.12 | 10.03 | 20.89 | 28.59 | 2 | 7281.89 | Gas driven | Opened |
| 13 | 7.78 | 11.20 | 21.58 | 52.06 | 2 | 17857.80 | Electric driven | Opened |
| 14 | 9.10 | 9.10 | 32.80 | 32.80 | 0 | 0 | Gas driven | Opened |

TABLE 5

Optimization scheme of the west-east line 3 for target 1

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 10.11 | 20.37 | 53.04 | 2 | 8079.30 | Gas driven | Opened |
| 2 | 8.43 | 11.45 | 22.35 | 47.90 | 2 | 6372.84 | Electric driven | Opened |
| 3 | 9.96 | 9.96 | 23.61 | 23.61 | 0 | 0 | Electric driven | Opened |
| 4 | 9.02 | 9.02 | 6.64 | 6.64 | 0 | 0 | Electric driven | Opened |
| 5 | 7.93 | 10.61 | 5.82 | 28.83 | 1 | 14484.17 | Electric driven | Closed |
| 6 | 8.88 | 11.24 | 19.85 | 39.27 | 2 | 9001.09 | Gas driven | Closed |
| 7 | 9.05 | 10.98 | 30.42 | 46.76 | 2 | 7641.17 | Gas driven | Closed |
| 8 | 8.91 | 9.74 | 27.42 | 34.85 | 1 | 1069.94 | Gas driven | Opened |
| 9 | 7.36 | 10.25 | 19.88 | 47.49 | 1 | 15063.98 | Gas driven | Opened |
| 10 | 7.72 | 11.11 | 28.44 | 59.65 | 2 | 14845.04 | Electric driven | Opened |
| 11 | 8.78 | 11.07 | 41.26 | 61.64 | 2 | 11173.50 | Electric driven | Opened |
| 12 | 8.70 | 10.03 | 22.69 | 34.33 | 1 | 2709.95 | Electric driven | Opened |
| 13 | 7.41 | 11.20 | 25.88 | 61.23 | 1 | 11214.36 | Electric driven | Opened |
| 14 | 8.89 | 8.89 | 38.17 | 38.17 | 0 | 0 | Electric driven | Opened |

Figure 10:
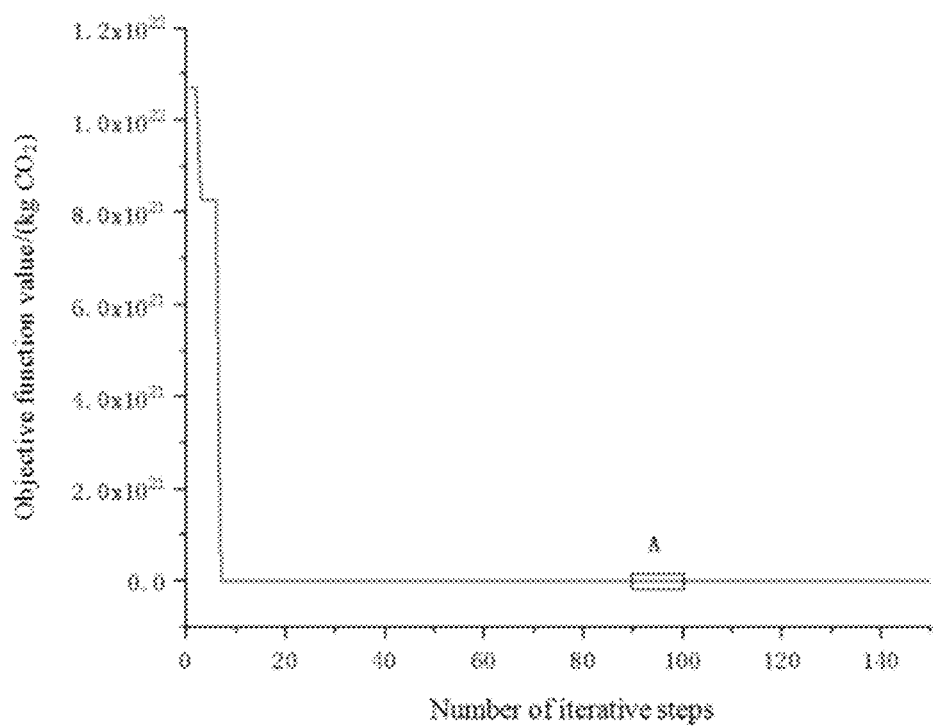
FIG. 10 is the optimization result diagram of Target 2 in the lines 2 and 3 of West-East Natural Gas Transmission Project in a specific embodiment.
Figure 11:
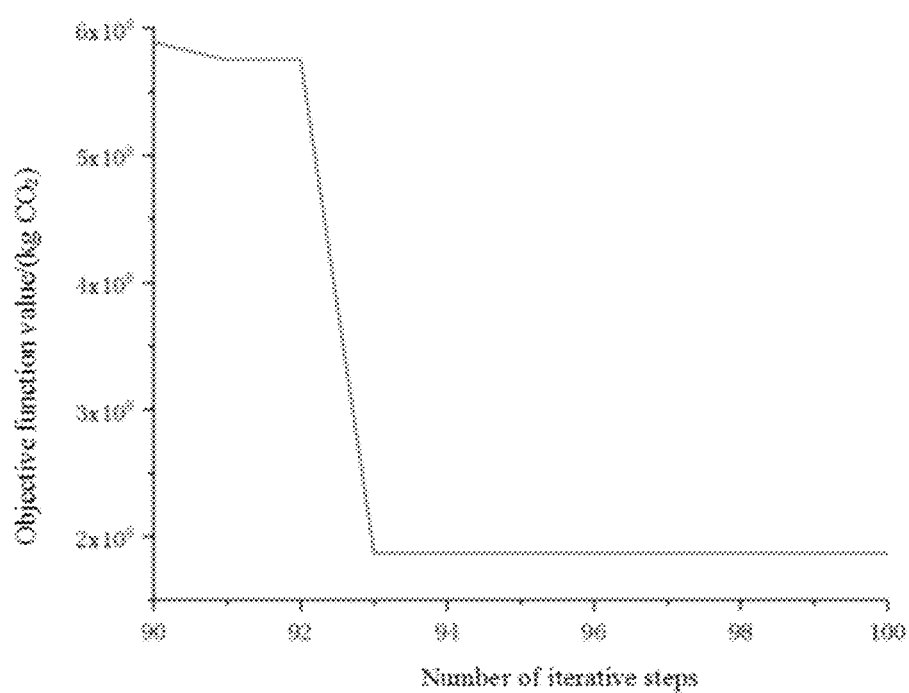
FIG. 11 is the schematic diagram of local enlargement A in FIG. 10.

The optimization results of min $C_2$ are shown in FIG. 10 and FIG. 11, in which the calculation results tend to be stable when the algorithm iterates to 93 steps. After the algorithm optimization results are substituted into the decision variable equation (1), the optimization scheme of Target 2 can be obtained and the results are shown in Table 6 and Table 7:

TABLE 6

Optimization scheme of the west-east line 2 for target 2

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 10.56 | 20.37 | 60.07 | 3 | 16349.45 | Gas driven | Opened |
| 2 | 9.02 | 9.02 | 26.50 | 26.50 | 0 | 0 | Gas driven | Opened |
| 3 | 7.97 | 10.02 | 12.68 | 31.01 | 2 | 7432.23 | Gas driven | Opened |
| 4 | 8.85 | 11.04 | 7.78 | 25.15 | 2 | 6699.45 | Gas driven | Opened |
| 5 | 9.55 | 9.55 | 15.72 | 15.73 | 0 | 0 | Electric driven | Opened |
| 6 | 7.81 | 11.67 | 11.34 | 43.95 | 2 | 14341.23 | Gas driven | Opened |
| 7 | 9.60 | 11.72 | 33.49 | 50.59 | 2 | 10897.92 | Gas driven | Opened |
| 8 | 9.87 | 9.87 | 28.84 | 28.84 | 0 | 0 | Gas driven | Opened |
| 9 | 7.59 | 10.68 | 16.78 | 44.88 | 1 | 7297.19 | Gas driven | Opened |
| 10 | 8.53 | 11.67 | 26.67 | 53.24 | 3 | 13941.28 | Electric driven | Opened |
| 11 | 9.61 | 11.70 | 36.87 | 53.96 | 2 | 8434.93 | Gas driven | Opened |
| 12 | 9.86 | 9.86 | 19.31 | 19.31 | 0 | 0 | Gas driven | Opened |
| 13 | 7.50 | 10.20 | 15.66 | 40.74 | 1 | 16594.21 | Electric driven | Opened |
| 14 | 7.78 | 9.01 | 26.67 | 38.91 | 1 | 8678.68 | Gas driven | Opened |

TABLE 7

Optimization scheme of the west-east line 3 for target 2

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 10.56 | 20.37 | 60.07 | 2 | 8814.00 | Gas driven | Opened |
| 2 | 9.50 | 9.50 | 23.34 | 23.35 | 0 | 0 | Electric driven | Opened |
| 3 | 7.48 | 10.02 | 13.94 | 37.55 | 2 | 8521.91 | Electric driven | Opened |
| 4 | 8.70 | 11.04 | 8.83 | 27.68 | 2 | 14928.00 | Electric driven | Opened |
| 5 | 9.63 | 9.63 | 16.65 | 16.65 | 0 | 0 | Electric driven | Opened |
| 6 | 8.08 | 11.67 | 11.64 | 41.40 | 2 | 9575.94 | Gas driven | Opened |
| 7 | 9.41 | 11.72 | 32.12 | 50.94 | 1 | 6382.90 | Gas driven | Opened |
| 8 | 9.66 | 9.66 | 29.63 | 29.63 | 0 | 0 | Gas driven | Opened |
| 9 | 7.17 | 10.68 | 17.55 | 50.66 | 2 | 19085.58 | Gas driven | Opened |
| 10 | 8.40 | 11.67 | 29.78 | 58.01 | 2 | 16428.21 | Electric driven | Opened |
| 11 | 9.38 | 11.70 | 40.51 | 59.88 | 2 | 11608.32 | Electric driven | Opened |
| 12 | 9.65 | 9.65 | 21.72 | 21.72 | 0 | 0 | Electric driven | Opened |
| 13 | 7.20 | 10.20 | 17.28 | 46.02 | 1 | 15220.15 | Electric driven | Opened |
| 14 | 7.81 | 9.01 | 29.44 | 41.49 | 1 | 5507.93 | Electric driven | Opened |

Carbon emissions and energy consumption are analyzed for actual schemes in Tables 2 and 3, optimization scheme of Target 1 in Tables 4 and 5 and optimization scheme of Target 2 in Tables 6 and 7.

Figure 12:
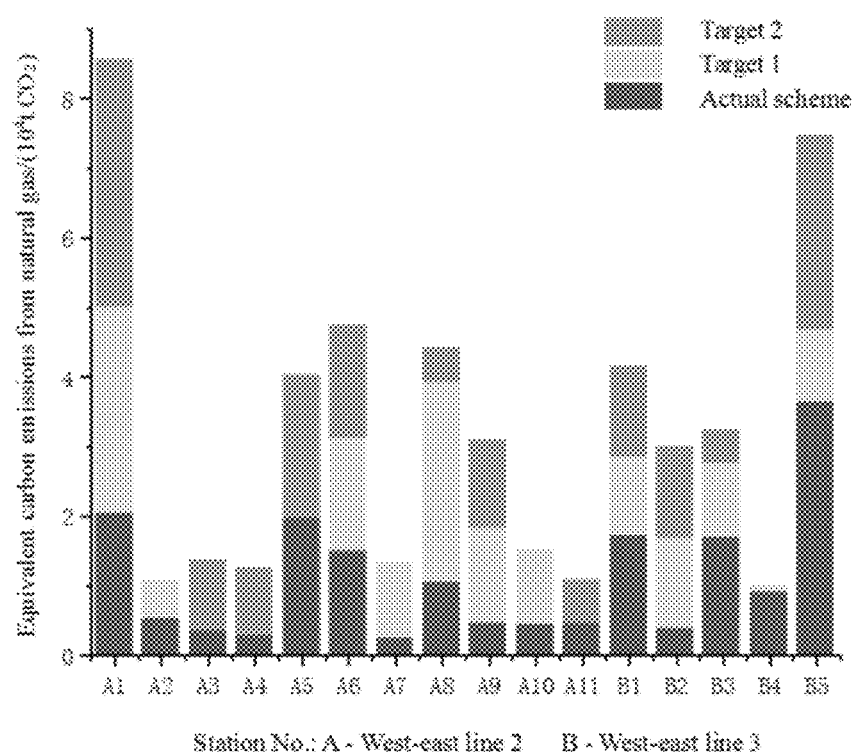
FIG. 12 is the schematic diagram of carbon emissions from natural gas in each station in different optimization schemes for a specific embodiment.
Figure 13:
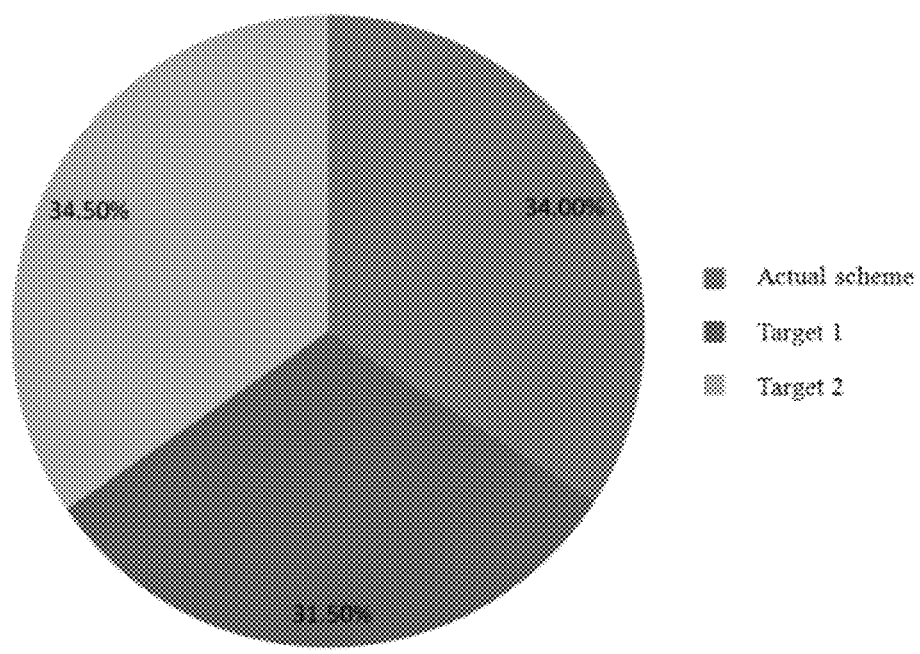
FIG. 13 is the schematic diagram of energy consumption ratio of natural gas in each station in different optimization schemes for a specific embodiment.

The carbon emission and energy consumption ratio of natural gas in each station are shown in FIG. 12 and FIG. 13. Seen from FIG. 12, the natural gas has the fewest carbon emissions in the optimization scheme of Target 1 and the natural gas has more carbon emissions in the optimization scheme of Target 2 than in the actual scheme. It shows that the carbon emissions of natural gas are reduced in the existing energy portfolio after optimization. If the energy structure is changed, the addition of wind power and photoelectricity will increase the carbon emissions of natural gas. Seen from FIG. 13, there is little difference in the energy consumption ratio between these three schemes. The consumption of natural gas in the optimization scheme of Target 1 is 2.5% lower than that in the actual scheme. The consumption of natural gas in the optimization scheme of Target 2 is 0.5% lower than that in the actual scheme.

Figure 14:
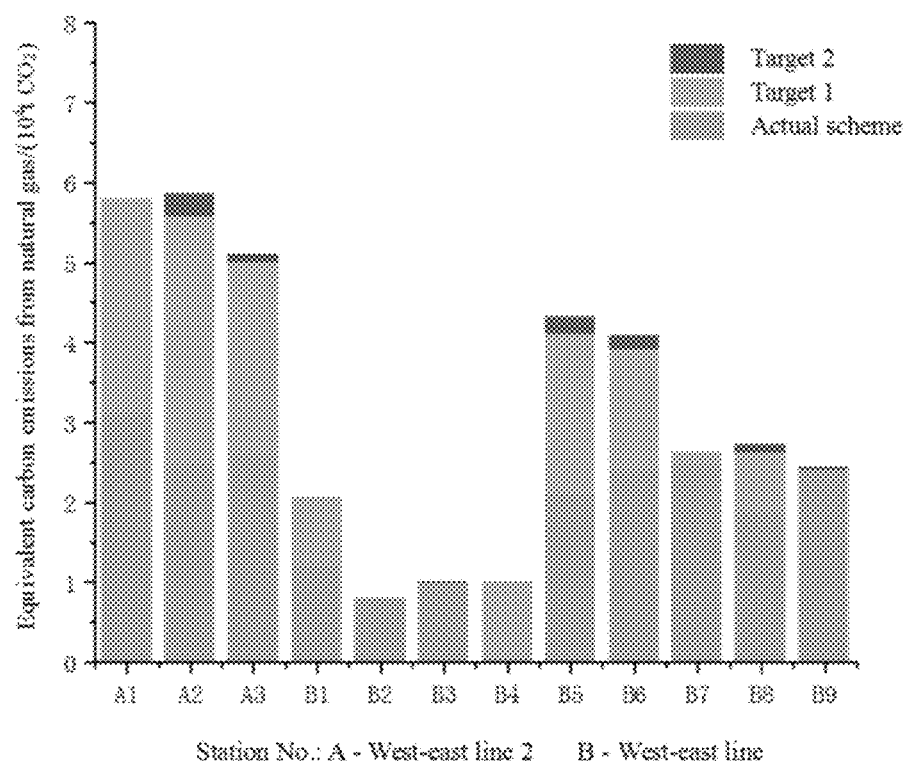
FIG. 14 is the schematic diagram of equivalent $CO_2$ emissions from electric energy in each station in different optimization schemes for a specific embodiment.
Figure 15:
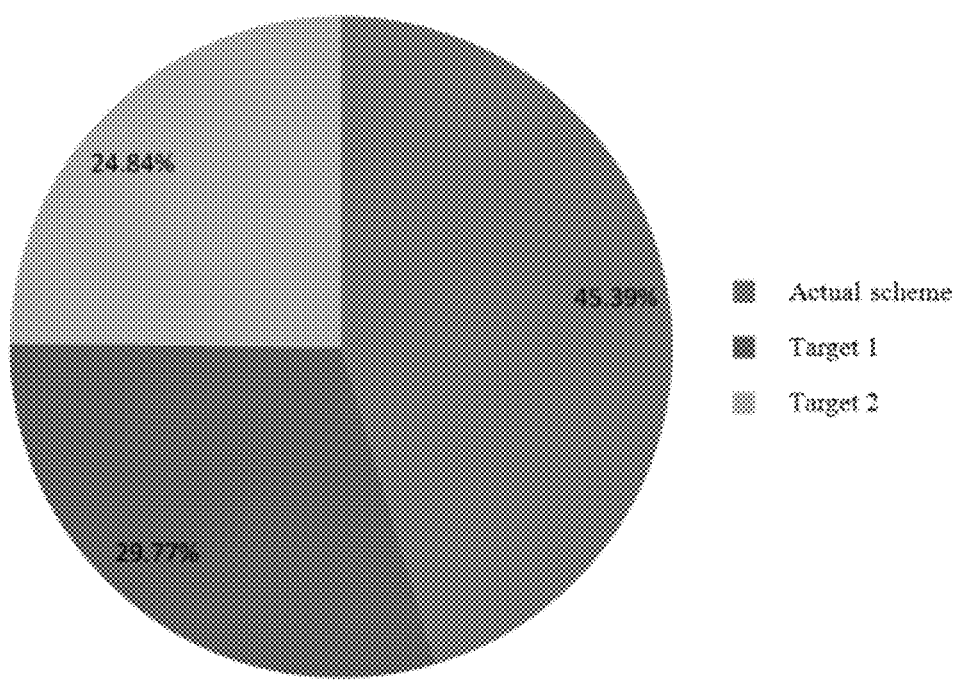
FIG. 15 is the schematic diagram of energy consumption ratio of electric energy in each station in different optimization schemes for a specific embodiment.

FIG. 14 and FIG. 15 show the equivalent $CO_2$ emission and energy consumption ratio of electric energy in each station. Seen from FIG. 14, among these three schemes, the actual scheme has the maximum overall carbon emission from electric energy, the overall carbon emission in the optimization scheme of Target 1 is smaller than that in the actual scheme, and the carbon emission in the optimization scheme of Target 2 is much smaller than that in the other two schemes, indicating that the introduction of wind power and photoelectricity greatly reduces the $CO_2$ emissions. Seen from FIG. 15, the consumption of electric energy in the optimization scheme of Target 1 is 15.62% lower than that in the actual scheme, and the consumption of electric energy in the optimization scheme 2 is 20.55% lower than that in the actual scheme.

Figure 16:
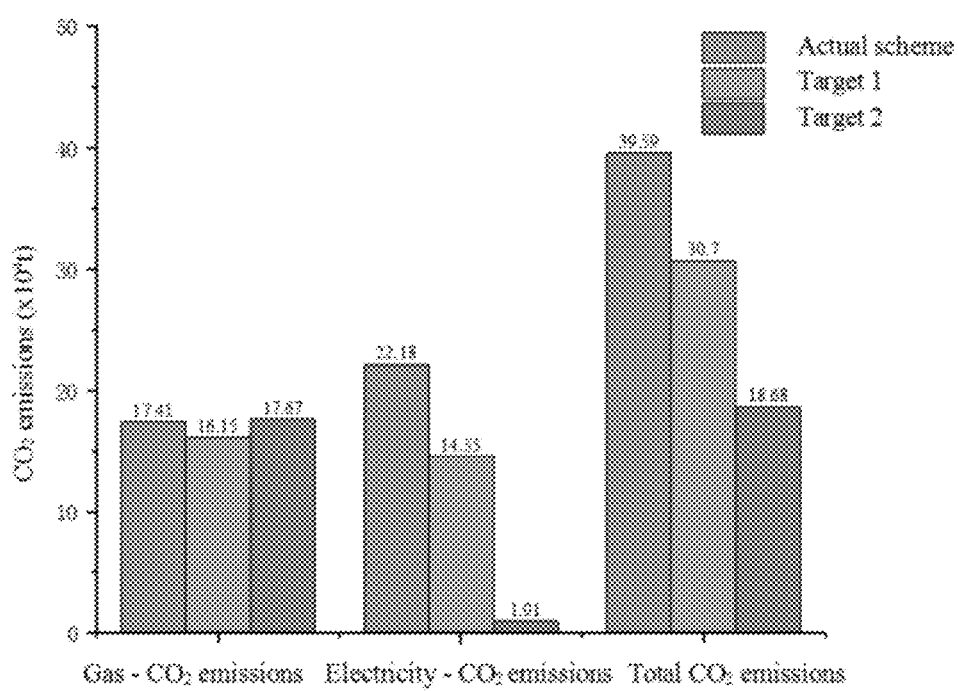
FIG. 16 is the schematic diagram of total $CO_2$ emissions in different optimization schemes for a specific embodiment.

To sum up, when the wind power and photoelectricity are used (Target 2), the system will be more inclined to consume natural gas. In the existing energy structure (Target 1), the system will be more inclined to consume electric energy. The total carbon emissions in all schemes are shown in FIG. 16. Seen from FIG. 16, the optimization of existing energy types in the pipeline can reduce the total $CO_2$ emissions by 22.46%, among which the $CO_2$ emissions from natural gas are reduced by 7.24% and the $CO_2$ emissions from electric energy are reduced by 34.40%. According to the regional development trend of new energy, the introduction of wind power and photoelectricity into the system can reduce the total $CO_2$ emissions by 52.81%, among which the $CO_2$ emissions from natural gas are reduced by 1.49% and the $CO_2$ emissions from electric energy are reduced by 95.45%. It indicates that in order to reduce the $CO_2$ emissions of the pipeline, the existing energy should be optimized and new energy such as wind power and photoelectricity should be introduced into the long-distance natural gas pipeline system as soon as possible.

Figure 17:
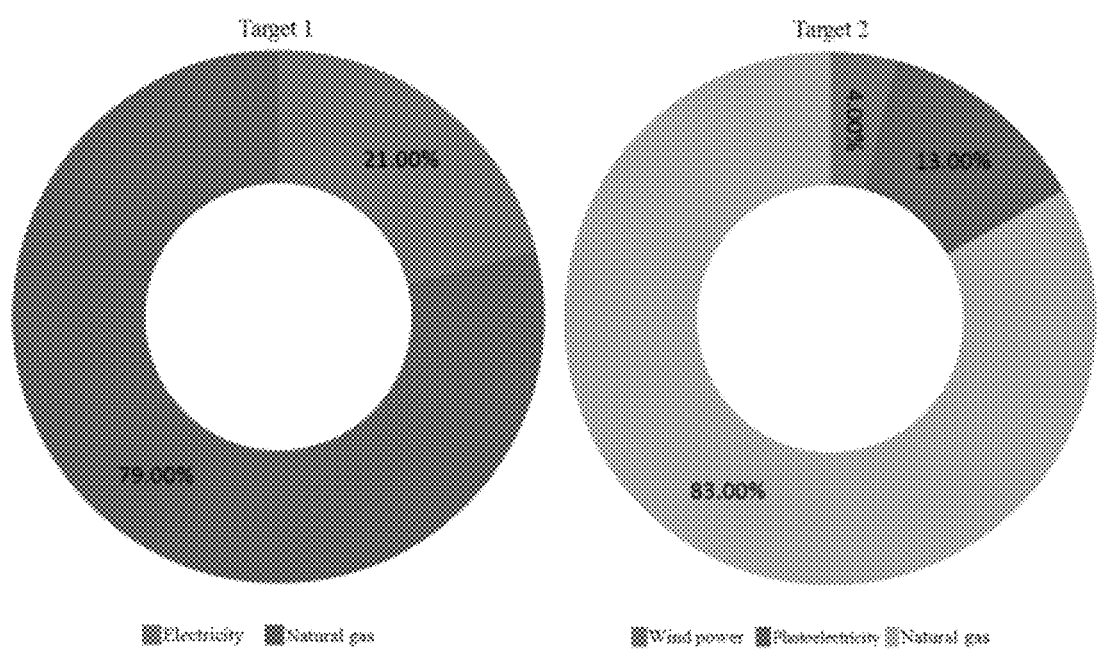
FIG. 17 is the schematic diagram of energy structure adjustment under the minimum carbon emission target of a specific embodiment.

Based on the above analysis, the adjustment of energy structure under the two targets in this embodiment is shown in FIG. 17. According to the adjusted energy structure, the total energy consumption calculated under Target 1 is 14.76% less than the actual total energy consumption, and the total energy consumption calculated under Target 2 is 11.44% less than the actual total energy consumption, indicating that when the minimum $CO_2$ emission is taken as the minimum target, the introduction of new energy will not minimize energy consumption, but it may also reduce part of energy consumption relative to the actual scheme.

In another specific embodiment, when the constraint conditions are set in the Step 5, the fourth constraint is about the carbon emissions of compressor in Equation (14). In this embodiment, NHPSO-JTVAC algorithm is used for optimization where the initial population is 50 and the number of iterations is 150. The carbon emission coefficient of natural gas is 2.1622 kg $CO_2/m^3$, the carbon emission coefficient of power grid is 0.6671 kg $CO_2$/kWh (average emission factor of power grid in the northwest region), the carbon emission coefficient of wind power is 0.0112 kg $CO_2$/kWh (carbon footprint-based power grid emission factor) and the carbon emission coefficient of photoelectricity is 0.0704 kg $CO_2$/kWh (carbon footprint-based power grid emission factor).

Figure 18:
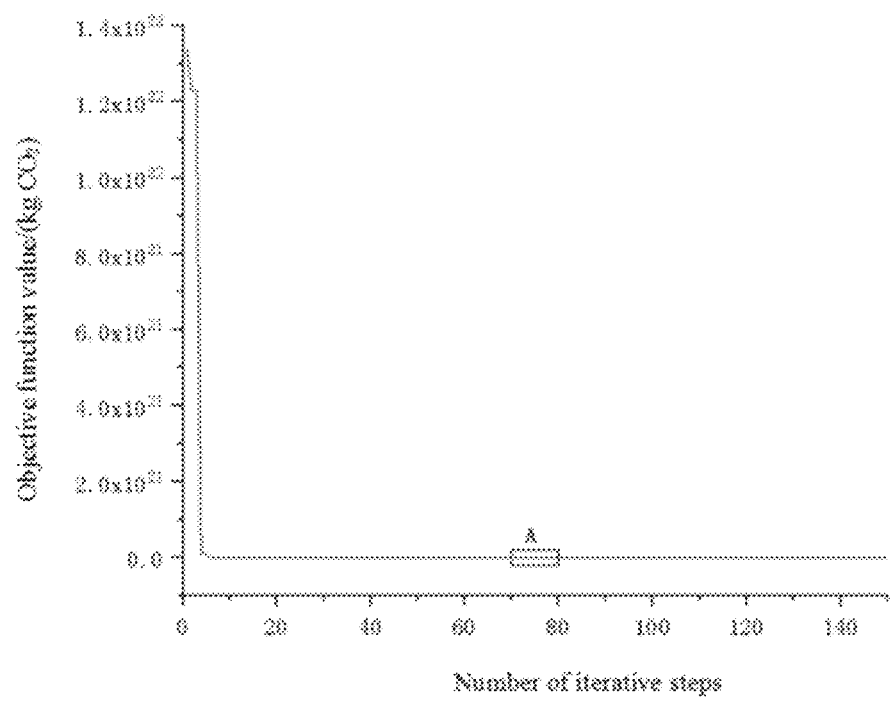
FIG. 18 is the optimization result diagram of Target 1 in the lines 2 and 3 of West-East Natural Gas Transmission Project in another specific embodiment.
Figure 19:
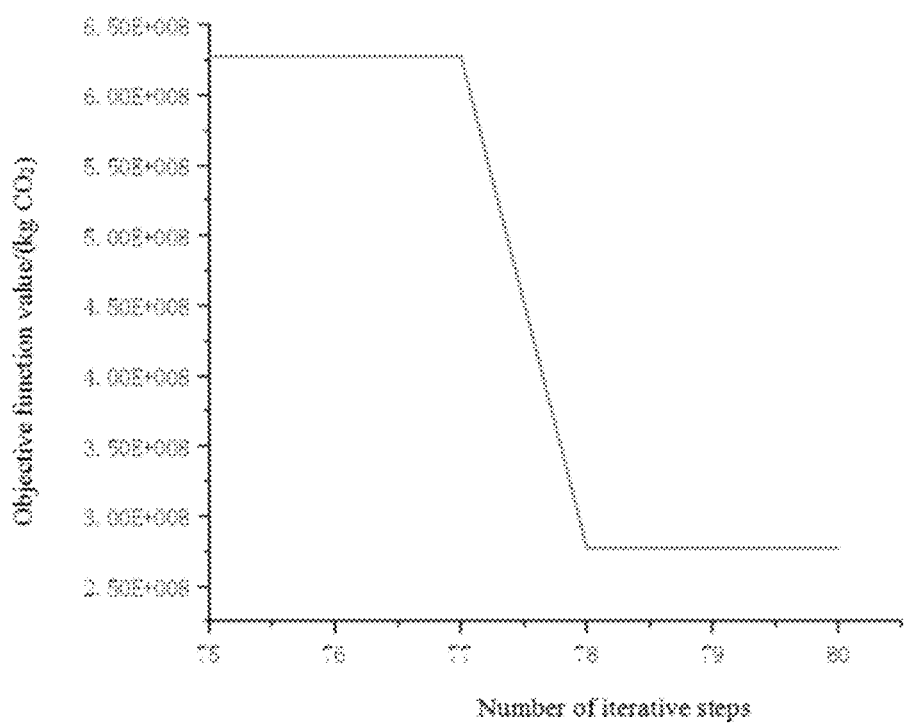
FIG. 19 is the schematic diagram of local enlargement A in FIG. 18.

The optimization results of min $C_1$ are shown in FIG. 18 and FIG. 19, in which the calculation results tend to be stable when the algorithm iterates to 78 steps. After the algorithm optimization results are substituted into the decision variable equation (1), the optimization scheme of Target 1 can be obtained and the results are shown in Table 8 and Table 9:

TABLE 8

Optimization scheme of the west-east line 2 for target 1

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 10.26 | 20.37 | 52.53 | 3 | 9126.69 | Gas driven | Opened |
| 2 | 9.07 | 11.46 | 16.93 | 36.00 | 2 | 6193.29 | Gas driven | Closed |
| 3 | 10.45 | 10.45 | 16.61 | 16.61 | 0 | 0 | Gas driven | Closed |
| 4 | 9.31 | 11.04 | 6.41 | 19.68 | 2 | 5610.45 | Gas driven | Closed |
| 5 | 9.37 | 9.37 | 13.28 | 13.28 | 0 | 0 | Electric driven | Closed |
| 6 | 8.29 | 10.87 | 9.25 | 30.72 | 2 | 10362.05 | Gas driven | Opened |
| 7 | 8.59 | 11.71 | 24.63 | 50.76 | 2 | 11881.08 | Gas driven | Opened |
| 8 | 9.84 | 9.84 | 28.97 | 28.97 | 0 | 0 | Gas driven | Opened |
| 9 | 7.51 | 11.70 | 16.96 | 53.89 | 2 | 23575.53 | Gas driven | Opened |
| 10 | 9.71 | 9.71 | 31.37 | 31.36 | 0 | 0 | Electric driven | Opened |
| 11 | 7.28 | 10.88 | 22.95 | 56.94 | 1 | 8970.31 | Gas driven | Opened |
| 12 | 8.71 | 11.00 | 20.53 | 39.73 | 2 | 8980.37 | Gas driven | Opened |
| 13 | 8.70 | 11.48 | 29.13 | 52.72 | 2 | 10921.39 | Electric driven | Opened |
| 14 | 9.54 | 9.54 | 32.94 | 32.94 | 0 | 0 | Gas driven | Opened |

TABLE 9

Optimization scheme of the west-east line 3 for target 1

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 10.26 | 20.37 | 52.53 | 3 | 8474.77 | Gas driven | Opened |
| 2 | 7.09 | 10.41 | 26.93 | 59.84 | 2 | 13292.24 | Electric driven | Closed |
| 3 | 8.62 | 11.20 | 29.05 | 51.34 | 2 | 8037.28 | Electric driven | Closed |
| 4 | 10.09 | 11.40 | 10.06 | 19.68 | 1 | 4284.85 | Electric driven | Closed |
| 5 | 10.18 | 10.18 | 12.04 | 12.04 | 0 | 0 | Electric driven | Closed |
| 6 | 8.15 | 10.87 | 9.15 | 32.03 | 2 | 9535.87 | Gas driven | Opened |
| 7 | 8.67 | 11.71 | 25.44 | 50.93 | 2 | 7506.71 | Gas driven | Opened |
| 8 | 9.67 | 9.67 | 29.56 | 29.56 | 0 | 0 | Gas driven | Opened |
| 9 | 7.23 | 11.70 | 17.41 | 57.68 | 1 | 4394.87 | Gas driven | Opened |
| 10 | 9.69 | 9.69 | 33.21 | 33.21 | 0 | 0 | Electric driven | Opened |
| 11 | 7.20 | 10.88 | 24.20 | 59.30 | 3 | 9728.78 | Electric driven | Opened |
| 12 | 8.70 | 11.00 | 21.19 | 40.54 | 2 | 16472.33 | Electric driven | Opened |
| 13 | 8.65 | 11.48 | 29.76 | 53.87 | 2 | 18617.53 | Electric driven | Opened |
| 14 | 9.27 | 9.27 | 34.27 | 34.27 | 0 | 0 | Electric driven | Opened |

Figure 20:
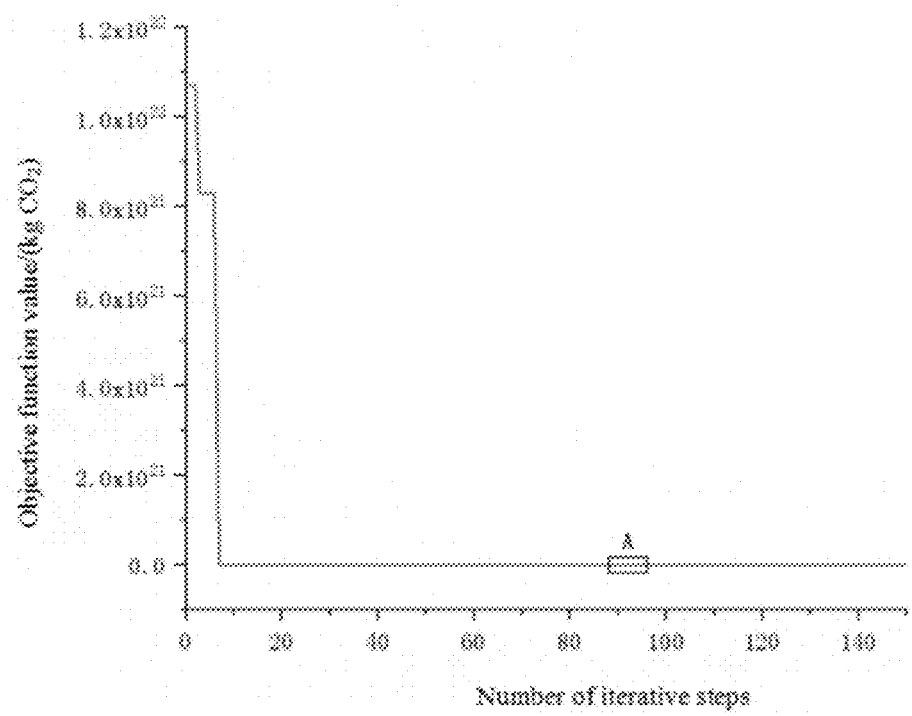
FIG. 20 is the optimization result diagram of Target 2 in the lines 2 and 3 of West-East Natural Gas Transmission Project in another specific embodiment.
Figure 21:
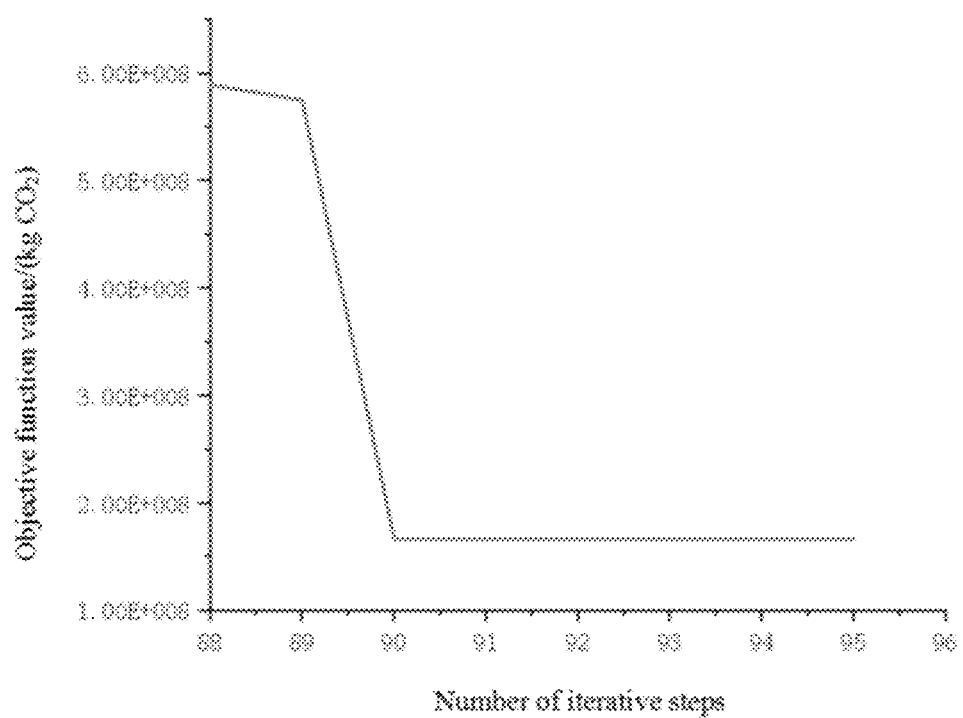
FIG. 21 is the schematic diagram of local enlargement A in FIG. 20.

The optimization results of min $C_1$ are shown in FIG. 20 and FIG. 21, in which the calculation results tend to be stable when the algorithm iterates to 90 steps. After the algorithm optimization results are substituted into the decision variable equation (1), the optimization scheme of Target 2 can be obtained and the results are shown in Table 10 and Table 11:

TABLE 10

Optimization scheme of the west-east line 2 for target 2

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 9.87 | 20.37 | 48.44 | 2 | 10492.10 | Gas driven | Opened |
| 2 | 6.60 | 9.77 | 24.99 | 58.36 | 2 | 10518.27 | Gas driven | Closed |
| 3 | 8.69 | 8.69 | 22.98 | 22.98 | 0 | 0 | Gas driven | Closed |
| 4 | 7.54 | 9.21 | 6.65 | 22.28 | 1 | 6131.33 | Gas driven | Closed |
| 5 | 7.83 | 11.04 | 13.56 | 41.50 | 2 | 12497.17 | Electric driven | Closed |
| 6 | 9.31 | 11.46 | 28.32 | 45.79 | 2 | 7579.38 | Gas driven | Opened |
| 7 | 9.28 | 11.62 | 34.84 | 54.25 | 1 | 5489.97 | Gas driven | Opened |
| 8 | 9.55 | 9.55 | 30.92 | 30.92 | 0 | 0 | Gas driven | Opened |
| 9 | 7.13 | 10.53 | 17.98 | 50.31 | 2 | 14480.86 | Gas driven | Opened |
| 10 | 8.28 | 10.32 | 29.39 | 48.06 | 1 | 14060.17 | Electric driven | Opened |
| 11 | 7.83 | 10.47 | 33.92 | 59.16 | 1 | 5298.80 | Gas driven | Opened |
| 12 | 8.23 | 9.89 | 20.92 | 36.03 | 1 | 4300.03 | Gas driven | Opened |
| 13 | 7.51 | 11.25 | 26.55 | 61.18 | 1 | 11390.69 | Electric driven | Opened |
| 14 | 9.23 | 9.23 | 37.34 | 37.34 | 0 | 0 | Gas driven | Closed |

TABLE 11

Optimization scheme of the west-east line 3 for target 2

| Station No. | Inlet pressure (MPa) | Outlet pressure (MPa) | Inlet temperature (° C.) | Outlet temperature (° C.) | Number of compressors started | Compressor power (kW) | Drive type | Connection status of valve |
|---|---|---|---|---|---|---|---|---|
| 1 | 6.48 | 9.87 | 20.37 | 48.44 | 2 | 6352.72 | Gas driven | Opened |
| 2 | 8.55 | 9.43 | 16.52 | 24.34 | 1 | 6030.51 | Electric driven | Closed |
| 3 | 7.44 | 10.19 | 14.33 | 39.93 | 2 | 10186.82 | Electric driven | Closed |
| 4 | 8.68 | 8.68 | 9.73 | 9.73 | 0 | 0 | Electric driven | Closed |
| 5 | 6.58 | 10.99 | 7.67 | 45.83 | 2 | 21716.66 | Electric driven | Closed |
| 6 | 9.61 | 11.46 | 29.52 | 44.39 | 2 | 12178.80 | Gas driven | Opened |
| 7 | 9.16 | 11.62 | 34.11 | 54.59 | 2 | 12712.19 | Gas driven | Opened |
| 8 | 9.66 | 9.66 | 30.69 | 30.69 | 0 | 0 | Gas driven | Opened |
| 9 | 7.25 | 10.53 | 17.91 | 48.81 | 2 | 26931.66 | Gas driven | Opened |
| 10 | 8.20 | 10.32 | 28.86 | 48.31 | 1 | 10437.94 | Electric driven | Opened |
| 11 | 7.94 | 10.47 | 33.81 | 57.71 | 3 | 13204.81 | Electric driven | Opened |
| 12 | 8.10 | 9.89 | 20.98 | 37.46 | 2 | 8712.50 | Electric driven | Opened |
| 13 | 7.30 | 11.25 | 27.86 | 65.24 | 2 | 18580.63 | Electric driven | Opened |
| 14 | 8.72 | 10.46 | 40.96 | 56.89 | 3 | 5240.14 | Electric driven | Closed |

Carbon emissions and energy consumption are analyzed for actual schemes in Tables 2 and 3, optimization scheme of Target 1 in Tables 8 and 9 and optimization scheme of Target 2 in Tables 10 and 11.

Figure 22:
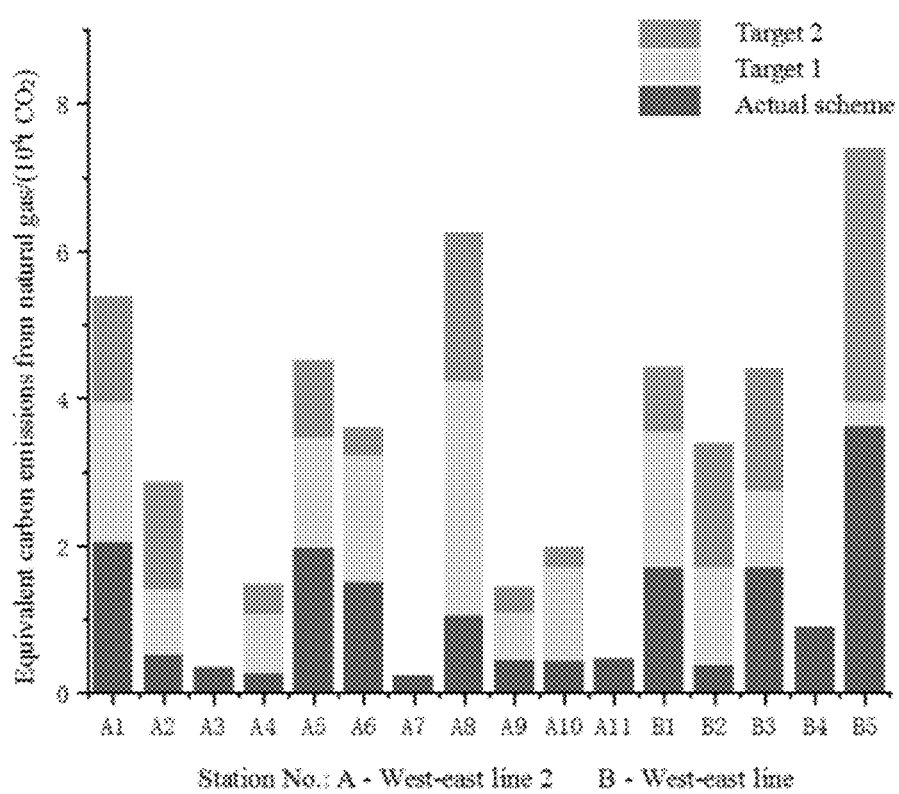
FIG. 22 is the schematic diagram of carbon emissions from natural gas in each station in different optimization schemes for another specific embodiment.
Figure 23:
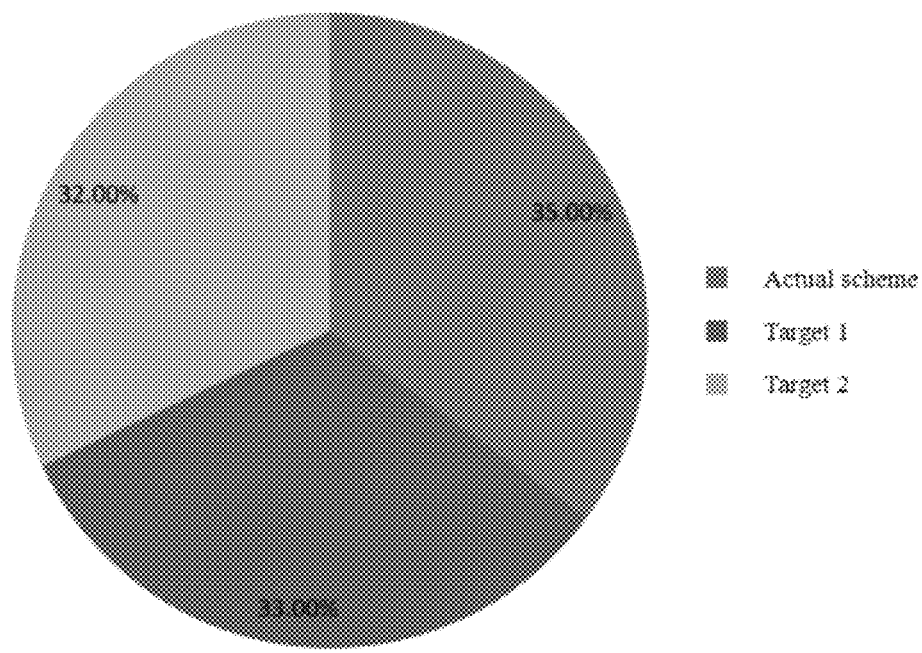
FIG. 23 is the schematic diagram of energy consumption ratio of natural gas in each station in different optimization schemes for another specific embodiment.

The carbon emission and energy consumption ratio of natural gas in each station are shown in FIG. 22 and FIG. 23. Seen from FIG. 22, in different schemes, the carbon emissions in each station are inconsistent. However, after calculation, the total carbon emissions from gas consumption under Target 1 are $16.39 \times 10^4$ t $CO_2$, and the total carbon emissions from gas consumption under Target 2 are $15.55 \times 10^4$ t $CO_2$. In the actual scheme, the total carbon emissions from gas consumption is $17.41 \times 10^4$ t $CO_2$. It indicates that there is little difference in the carbon emissions of natural gas between these three schemes after optimization, and the carbon emissions from gas consumption in the optimization scheme is slightly less than that in the actual scheme. Seen from FIG. 23, there is little difference in the energy consumption ratio between these three schemes. The consumption of natural gas in the optimization scheme of Target 1 is 2% lower than that in the actual scheme. The consumption of natural gas in the optimization scheme of Target 2 is 3% lower than that in the actual scheme.

Figure 24:
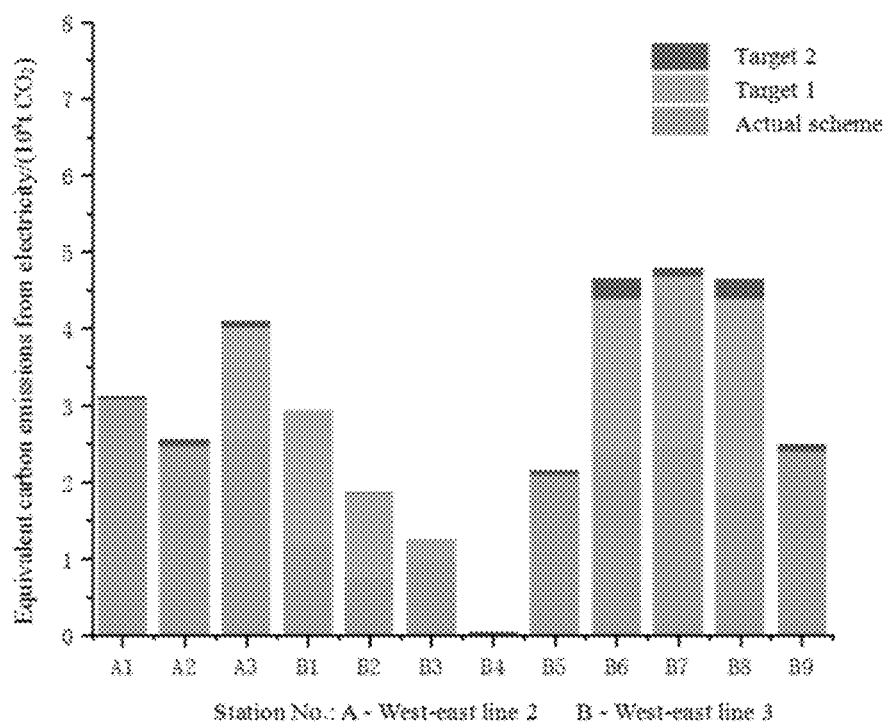
FIG. 24 is the schematic diagram of equivalent $CO_2$ emissions from electric energy in each station in different optimization schemes for another specific embodiment.
Figure 25:
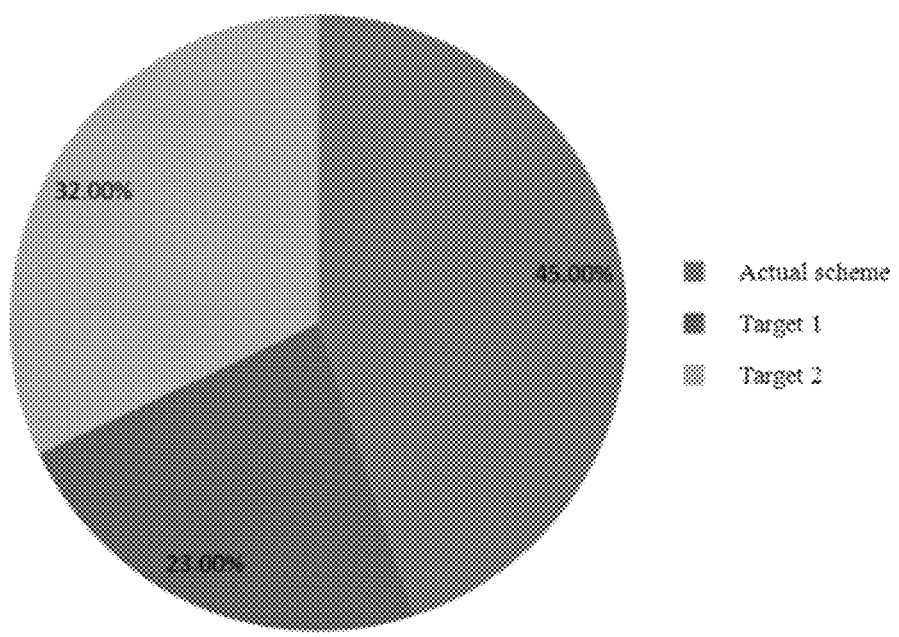
FIG. 25 is the schematic diagram of energy consumption ratio of electric energy in different optimization schemes for another specific embodiment.

FIG. 24 and FIG. 25 show the equivalent $CO_2$ emission and energy consumption ratio of electric energy in each station. Seen from FIG. 24, among these three schemes, the actual scheme has the maximum overall carbon emission from electric energy, the overall carbon emission in the optimization scheme of Target 1 is smaller than that in the actual scheme, and the carbon emission in the optimization scheme of Target 2 is much smaller than that in the other two schemes, indicating that the introduction of wind power and photoelectricity greatly reduces the $CO_2$ emissions. Seen from FIG. 25, the consumption of electric energy in the optimization scheme of Target 1 is 22% lower than that in the actual scheme, and the consumption of electric energy in the optimization scheme 2 is 13% lower than that in the actual scheme.

Figure 26:
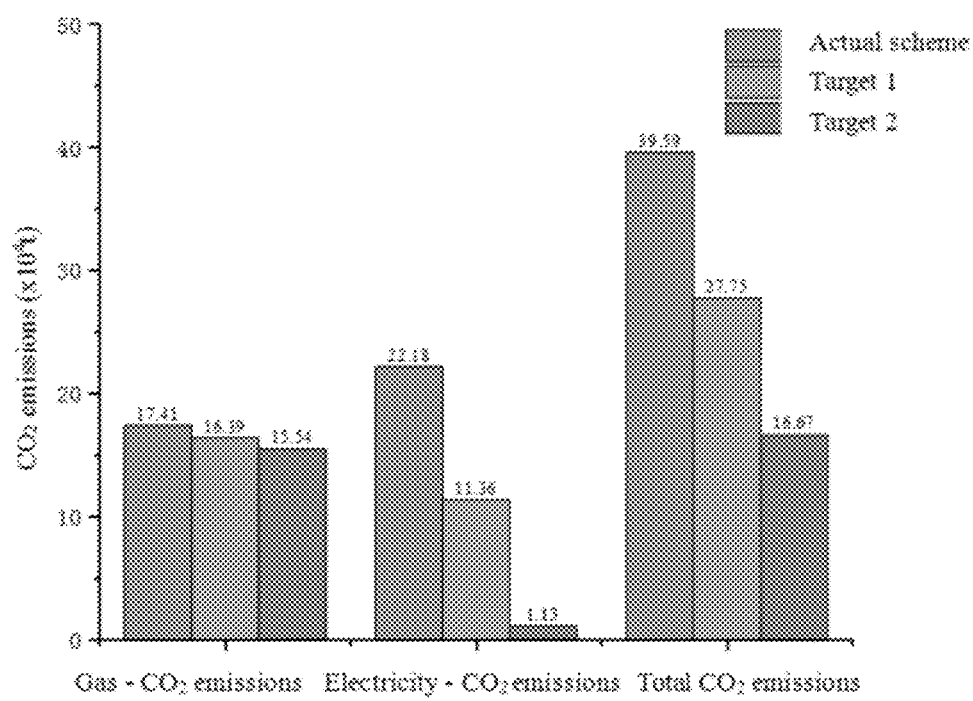
FIG. 26 is the schematic diagram of total $CO_2$ emissions in different optimization schemes for another specific embodiment.

To sum up, there is little difference in the carbon emissions from gas consumption between these three schemes. However, after the introduction of wind power and photoelectricity, the power consumption of optimization target 1 is obviously larger than that of optimization target 2, but the carbon emissions from electric energy under Target 2 are greatly reduced. The total carbon emissions in each scheme are shown in FIG. 26. Seen from FIG. 26, the optimization of existing energy types in the pipeline can reduce the total $CO_2$ emissions by 29.90%, among which the $CO_2$ emissions from natural gas are reduced by 7.75% and the $CO_2$ emissions from electric energy are reduced by 48.78%. According to the regional development trend of new energy, the introduction of wind power and photoelectricity into the system can reduce the total $CO_2$ emissions by 57.89%, among which the $CO_2$ emissions from natural gas are reduced by 10.74% and the $CO_2$ emissions from electric energy are reduced by 94.90%. It indicates that in order to reduce the $CO_2$ emissions of the pipeline, the existing energy should be optimized and new energy such as wind power and photoelectricity should be introduced into the long-distance natural gas pipeline system as soon as possible.

Figure 27:
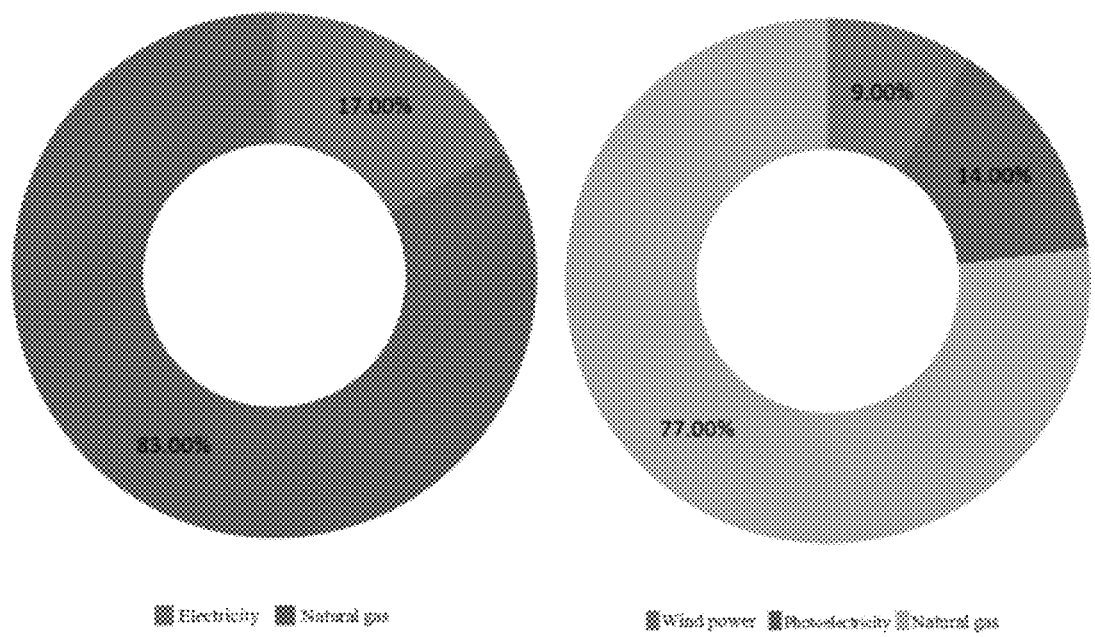
FIG. 27 is the schematic diagram of energy structure adjustment under the minimum carbon emission target of another specific embodiment.

Based on the above analysis, the adjustment of energy structure under the two targets in this embodiment is shown in FIG. 27. According to the adjusted energy structure, the total energy consumption calculated under Target 1 is 17.73% less than the actual total energy consumption, and the total energy consumption calculated under Target 2 is 15.48% less than the actual total energy consumption, indicating that when the minimum $CO_2$ emission is taken as the minimum target, the introduction of new energy will not minimize energy consumption, but it may also reduce part of energy consumption relative to the actual scheme.

To sum up, the present invention is to establish an objective function for minimum carbon emissions based on the existing energy structure and the introduction of new energy (such as wind power and photoelectricity), so as to reduce the carbon emissions of pipeline system, guide the field operation to make operation strategy and put forward the optimal operation mode with low carbon emissions for the specific pipeline. If compared with the prior art, the present invention shows significant progress.

The above are only the preferred embodiments, which are not intended to limit the present invention in any form. Although the present invention has been disclosed as above with preferred embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

What is claimed is:

1. An optimization method for determining a natural gas pipeline operation plan for optimizing operation of a natural gas pipeline under carbon neutrality target, comprising following steps:

Step 1: Determine a type of decision variable, and obtain initial inlet parameters of a compressor station; the decision variable is as follows:

$$X=(Q,N,R,S) \tag{1}$$

Where, X is the decision variable; Q is a natural gas pipeline transmission capacity, in $m^3/s$; N is a number of compressors started in each compressor station; R is a rotating speed of a compressor, in l/min; S is a connection status between two pipelines;

Step 2: Judge the connection status between the two pipelines, determine a gas flow of each pipe according to the connection status, and then calculate an outlet pressure and an outlet let temperature of a compressor station between the two pipelines;

Step 3: Configure the compressor station to make the outlet pressure of the compressor station equal to an inlet pressure of a next pipe section and the outlet temperature of the compressor station equal to an inlet temperature of the next pipe section, and then calculate a terminal temperature and a terminal pressure of the next pipe section;

Step 4: Configure a previous pipe section to a terminal pressure of the previous pipe section equal to the inlet pressure of the compressor station at the next pipe section and a terminal temperature of the previous pipe section equal to the inlet temperature of the compressor station at the next pipe section; repeat the Steps 2 to 4 until pressure and temperature changes of each compressor station in the natural gas pipeline are calculated;

Step 5: Set constraint conditions and calculate a gas consumption of a gas driven compressor and a power consumption of an electric driven compressor in the natural gas pipeline;

Step 6: Identify a carbon emission coefficient, calculate carbon emissions of the compressors driven by different energy sources, and establish an objective function for minimum carbon emissions; when the objective function for the minimum carbon emissions is established, the following conditions are assumed: the gas flow in the natural gas pipeline is steady and the gas flow is equally distributed between the compressors in each compressor station; and the objective function for the minimum carbon emissions is shown as follows:

$$\min C_1 = \min \sum_{i=1}^{N_i} \sum_{j=1}^{j=N_j} \varepsilon_g C_{i,g}^j + \sum_{i=1}^{N_i} \sum_{k=1}^{k=N_k} \varepsilon_e C_{i,e}^k \quad (18)$$

$$\min C_2 = \min \sum_{i=1}^{N_i} \sum_{j=1}^{j=N_j} \varepsilon_g C_{i,g}^j + \sum_{i=1}^{N_i} \sum_{u=1}^{u=N_u} \varepsilon_{ne} C_{i,ne}^u \quad (19)$$

Where, $\min C_1$ is the objective function for the minimum carbon emissions for the natural gas pipeline containing the gas driven compressor and the electric driven compressor; $\min C_2$ is the objective function for the minimum carbon emissions for the natural gas pipeline containing the gas driven compressor and a new energy driven compressor; $N_i$ is a total number of pipes; $N_j$ is a total number of gas driven compressors; $N_k$ is a total number of electric driven compressors; $N_u$ is a total number of new energy driven compressors; $\varepsilon_g$ is the carbon emission coefficient of natural gas, in kg $CO_2/m^3$; $\varepsilon_e$ is the carbon emission coefficient of a power grid, in kg $CO_2/kWh$; $\varepsilon_{ne}$ is the carbon emission coefficient of a new energy; $C_{i,g}^j$ is the gas consumption of a gas driven compressor j on a pipe i; $C_{i,e}^j$ is the power consumption of an electric driven compressor k on the pipe i; $C_{i,ne}^u$ is an energy consumption of a new energy driven compressor u on the pipe i;

Step 7: Use an optimization algorithm to solve the objective function for the minimum carbon emissions and determine the natural gas pipeline operation plan based on a minimum carbon emission target according to the result optimization algorithm results, wherein the natural gas pipeline is operated according to the natural gas pipeline operation plan under the carbon neutrality target.

2. The optimization method according to claim 1, wherein in the Step 1, when S=0, it indicates that a communication valve between the two pipelines is closed and there is no flow distribution between the two pipelines; and when S=1, it indicates that the communication valve between the two pipes is opened and there is flow distribution between the two pipelines.

3. The optimization method according to claim 1, wherein in the Step 2, the outlet pressure and the outlet temperature of the compressor station are respectively calculated according to the following equations:

$$P_{out} = P_{in}(\frac{HM_w}{ZRT_{in}}\frac{k-1}{k}+1)^{\frac{k}{k-1}} \quad (2)$$

$$T_{out} = T_{in}\left(1 + \frac{1}{k_t} \times \left(\left(\frac{P_{out}}{P_{in}}\right)^{\frac{k-1}{k}} - 1\right)\right) \quad (3)$$

Where, $P_{out}$ is the outlet pressure of the compressor, in MPa; $P_{in}$ is the inlet pressure of the compressor, in MPa; H is a polytropic head of the compressor; $M_w$ is a molecular weight of gas, in kg $mol^{-1}$; k is a polytropic index of gas; Z is a compressibility factor of the natural gas; R is a gas constant, in J $mol^{-1}$ $K^{-1}$; $T_{in}$ is the inlet temperature of the compressor, in K; $T_{out}$ is the outlet temperature of the compressor, in K; $k_t$ is a temperature rise coefficient.

4. The optimization method according to claim 1, wherein in the Step 3, the terminal temperature and the terminal pressure of the next pipe section are respectively calculated according to the following equations:

$$T_Z = T_0 + (T_Q - T_0)e^{-\alpha L} \quad (4)$$

$$\alpha = \frac{K\pi D}{Mc_p} \quad (5)$$

$$P_Z = \sqrt{P_Q^2(1 - a\Delta S) - bM^2 L(1 - \frac{a\Delta S}{2})} \quad (6)$$

$$a = \frac{2g}{ZRT_{cp}} \quad (7)$$

$$b = \frac{16\lambda ZRT_{cp}}{\pi^2 D^5} \quad (8)$$

Where, $T_Z$ is the terminal temperature of the natural gas pipeline, in K; $T_0$ is a ground temperature at a buried depth of the natural gas pipeline, in K; $T_Q$ is the inlet temperature of the natural gas pipeline, in K; $\alpha$ is an intermediate parameter; L is a length of a calculated section of the natural gas pipeline, in m; K is a total heat transfer coefficient of the natural gas pipeline, in W/($m^2 \cdot$K); D is an outer diameter of the natural gas pipeline, in m; M is a mass flow of the gas, in kg/s; $c_p$ is a specific heat capacity of mass-constant pressure of the gas, in J/(kg·K); $P_Z$ is the terminal pressure of the natural gas pipeline, in Pa; $P_Q$ is the inlet pressure of the natural gas pipeline, in Pa; a and b are intermediate parameters; $\Delta S$ is a difference of elevation between an end point and a starting point, in m; g is a gravitational acceleration, in $m/s^2$; Z is a compressibility factor of the natural gas; R is a gas constant, in J $mol^{-1}$ $K^{-1}$; $T_{cp}$ is an average temperature of the natural gas pipeline, in K; $\lambda$ is a hydraulic friction coefficient.

5. The optimization method according to claim 4, wherein in the Equation (8), the hydraulic friction coefficient is calculated through a following equation:

$$\frac{1}{\sqrt{\lambda}} = -2.01 \cdot lg\left(\frac{k'}{3.71d} + \frac{2.51}{Re\sqrt{\lambda}}\right) \quad (9)$$

Where, lg is a log function; k' is an absolute equivalent roughness of a pipe wall, in mm; d is an inner diameter of the natural gas pipeline, in m; Re is a Reynolds number.

6. The optimization method according to claim 1, wherein in the Step 5, the constraint conditions comprise:
(1) Constraint on a compressor speed $$R_{min} \leq R_n \leq R_{max} \quad (10)$$

Where, $R_{min}$ is a minimum rotating speed of the compressor, in l/min; $R_n$ is the rotating speed of the compressor in a Compressor Station n; $R_{max}$ is a maximum rotating speed of the compressor, in l/min;

(2) Constraint on a pipeline pressure $$P_{m\ min} \leq P_m \leq P_{m\ max}\ (m=1,2\ldots N_m) \tag{11}$$

Where, $P_{m\ min}$ is a minimum allowable pressure of a node m, in MPa; $P_m$ is a pressure of the node m, in MPa; $P_{m\ max}$ is a maximum allowable pressure of the node m, in MPa; $N_m$ is a total number of pipe nodes;

(3) Constraint on a flow balance $$\sum_{k \in C_{m'}} \sum_{m=1}^{N_m} \alpha_{mk} M_{1mk} + \sum_{m=1}^{N_m} M_{2m} - \sum_{j=1}^{N_j} C_{gj} = 0 \tag{12}$$

Where, $C_m$ is a set of components connected to the node m; $\alpha_{mk}$ is a coefficient, which is +1 when a component k flows into the node m, and −1 when the component k flows out of the node m; $M_{lmk}$ is an absolute value of flow when the component k connected to the node m flows into/out of the node m, in m³; $M_{2m}$ is the flow when the node m exchanges with outside, which is positive in case of an inflow and negative in case of an outflow, in m³; $C_{gj}$ is a natural gas mass of the gas consumption of the compressor station j, in m³;

(4) Constraint on a compressor power $$N_{w-min} \leq N_w \leq N_{w-max} \tag{13}$$

Where, $N_{w-min}$ is a minimum allowable power of the compressor, in MW; $N_w$ is an allowable power of the compressor, in MW; $N_{w-max}$ is a maximum allowable power of the compressor, in MW;

Or a constraint on carbon emissions of the compressor $$C_{min} \leq C \leq C_{max} \tag{14}$$

Where, $C_{min}$ is the minimum carbon emission of the compressor, in kg $CO_2$; C is the carbon emissions of the compressor, in kg $CO_2$; $C_{max}$ is the maximum carbon emissions of the compressor, in kg $CO_2$;

(5) Constraint on the outlet temperature of the compressor $$T_{out} \leq T_{out\ max} \tag{15}$$

Where, $T_{out}$ is the outlet temperature of the compressor, in K; and $T_{out\ max}$ is a maximum outlet temperature of the compressor, in K.

7. The optimization method according to claim 6, wherein in the Step 5, the gas consumption of the gas driven compressor in the natural gas pipeline is calculated through the following equation:

$$C_g = \frac{N_g t_g}{\eta_g} g_e \tag{16}$$

Where, $C_g$ is the gas consumption of a fuel driven compressor in the natural gas pipeline, in Nm³; Ng is a power of the gas driven compressor unit in the compressor station, in KW; $t_g$ is a running time of a gas driven compressor unit, in h; $\eta_g$ is an efficiency of a compressor driven gas turbine in the compressor station; $g_e$ is a gas consumption rate of gas turbine, in Nm³/(kWh);

The power consumption of the electric driven compressor is calculated through the following equation:

$$C_e = \frac{N_e t_e}{\eta_e} \tag{17}$$

Where, $C_e$ is the power consumption of the electric driven compressor, in kWh; $N_e$ is the power of electric driven compressor in the compressor station, in kW; $t_e$ is the running time of the electric driven compressor unit, in h; $\eta_e$ is the efficiency of a compressor driven motor in the compressor station.

8. The optimization method according to claim 1, wherein the objective function min $C_2$ for the minimum carbon emissions is as follows:

$$\min C_2 = \min \sum_{i=1}^{N_i} \sum_{j=1}^{j=N_j} \varepsilon_g C_{i,g}^j + \sum_{i=1}^{N_i} \sum_{w=1}^{w=N_w} \varepsilon_{e1} C_{i,e}^w + \sum_{i=1}^{N_i} \sum_{l=1}^{l=N_l} \varepsilon_{e2} C_{i,e}^l \tag{20}$$

Where, $N_w$ is a total number of wind power driven compressors; $N_l$ is a total number of photoelectricity driven compressors; $\varepsilon_{e1}$ is the carbon emission coefficient of wind energy, in kg $CO_2$/kWh; $\varepsilon_{e2}$ is the carbon emission coefficient of photoelectricity, in kg $CO_2$/kWh; $C_{i,e}^w$ is the power consumption of a wind power driven compressor w on the pipe i; $C_{i,e}^l$ is the power consumption of a photoelectricity driven compressor l on the pipe i.

9. The optimization method according to claim 1, wherein the carbon emission coefficient of the natural gas equals a carbon emission factor of the natural gas, the carbon emission coefficient of the power grid equals an average emission factor of a regional power grid, and the carbon emission coefficient of the new energy equals a carbon footprint-based power grid emission factor of the new energy.

* * * * *